(12) United States Patent
Drugeon et al.

(10) Patent No.: US 8,971,652 B2
(45) Date of Patent: *Mar. 3, 2015

(54) IMAGE CODING METHOD AND IMAGE DECODING METHOD FOR CODING AND DECODING IMAGE DATA ON A BLOCK-BY-BLOCK BASIS

(71) Applicant: Panasonic Intellectual Property Corporation of America, Torrance, CA (US)

(72) Inventors: Virginie Drugeon, Darmstadt (DE); Thomas Wedi, Gross-Umstadt (DE); Torsten Palfner, Langen (DE); Hisao Sasai, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/862,829

(22) Filed: Apr. 15, 2013

(65) Prior Publication Data

US 2013/0251039 A1 Sep. 26, 2013

Related U.S. Application Data

(63) Continuation of application No. 12/529,813, filed as application No. PCT/JP2009/000150 on Jan. 16, 2009, now Pat. No. 8,442,334.

(30) Foreign Application Priority Data

Jan. 18, 2008 (EP) .................................. 08000979

(51) Int. Cl.
*G06K 9/36* (2006.01)

(52) U.S. Cl.
USPC ........................ 382/238; 382/239; 382/243

(58) Field of Classification Search
CPC ........ H04N 7/30; H04N 7/50; H04N 7/26244
USPC ............................ 375/240.02, 240.12, 240.13
See application file for complete search history.

(56) References Cited

U.S. PATENT DOCUMENTS

| 6,157,676 A | 12/2000 | Takaoka et al. |
| 6,765,964 B1 | 7/2004 | Conklin |

(Continued)

FOREIGN PATENT DOCUMENTS

| CN | 1984340 A | 6/2007 |
| EP | 0 895 424 | 2/1999 |

(Continued)

OTHER PUBLICATIONS

Ziou, D., et al., "Edge detection techniques—an overview," International Journal of Pattern Recognition and Image Analysis, vol. 8 (1998), pp. 537-559.*

(Continued)

*Primary Examiner* — Vikkram Bali
*Assistant Examiner* — Xuemei Chen
(74) *Attorney, Agent, or Firm* — Wenderoth, Lind & Ponack, L.L.P.

(57) ABSTRACT

An image coding method performs intra prediction with a higher coding efficiency by coding image data on a block-by-block basis. The method generates a predicted block by predicting a current block; computes a difference between the current block and the predicted block; codes the difference computed in the computing; decodes the difference coded in the coding; and adds the difference decoded in the decoding to the predicted block to generate a decoded block. The generating of the predicted block includes detecting an edge in a previously decoded block corresponding to a block adjacent to the current block; and extrapolating or interpolating previously decoded image data corresponding to a pixel included in the block adjacent to the current block, along a direction of the edge detected in the detecting to generate the predicted block.

33 Claims, 21 Drawing Sheets

(56) References Cited

U.S. PATENT DOCUMENTS

| | | | |
|---|---|---|---|
| 6,907,142 | B2 | 6/2005 | Kalevo et al. |
| 8,295,351 | B2 * | 10/2012 | Palfner et al. ............ 375/240.13 |
| 8,743,957 | B2 * | 6/2014 | Liu et al. .................. 375/240.12 |
| 2001/0017942 | A1 | 8/2001 | Kalevo et al. |
| 2004/0136458 | A1 | 7/2004 | Dahlhoff et al. |
| 2005/0249429 | A1 | 11/2005 | Kitamura |
| 2005/0254717 | A1 | 11/2005 | Kalevo et al. |
| 2007/0014482 | A1 | 1/2007 | Kim et al. |
| 2007/0019726 | A1 | 1/2007 | Cha et al. |
| 2007/0036215 | A1 | 2/2007 | Pan et al. |
| 2007/0053433 | A1 | 3/2007 | Song |
| 2007/0098067 | A1 | 5/2007 | Kim et al. |
| 2007/0133891 | A1 | 6/2007 | Jeong |
| 2008/0247657 | A1 | 10/2008 | Kalevo et al. |
| 2009/0046202 | A1 | 2/2009 | Huang et al. |
| 2009/0225834 | A1 | 9/2009 | Song et al. |
| 2010/0208802 | A1 | 8/2010 | Tsukuba et al. |
| 2011/0150268 | A1 | 6/2011 | Hannigan et al. |
| 2012/0008675 | A1 * | 1/2012 | Karczewicz et al. .... 375/240.02 |
| 2012/0014443 | A1 * | 1/2012 | Maani et al. ............ 375/240.12 |
| 2012/0020580 | A1 | 1/2012 | Sasai et al. |
| 2012/0170652 | A1 * | 7/2012 | Guo et al. ................ 375/240.12 |

FOREIGN PATENT DOCUMENTS

| | | |
|---|---|---|
| EP | 1 761 063 | 3/2007 |
| JP | 4-277982 | 10/1992 |
| JP | 2006-523073 | 10/2006 |
| JP | 2007-166617 | 6/2007 |
| WO | 01/54416 | 7/2001 |
| WO | 03/049452 | 6/2003 |
| WO | 2004/080084 | 9/2004 |

OTHER PUBLICATIONS

Wilson Kwok et al., "*Multi-Directional Interpolation for Spatial Error Concealment*", IEEE Transactions on Consumer Electronics, vol. 39, No. 3, Aug. 1, 1993, pp. 455-460.

Dong Liu et al., "Image Compression with Edge-Based Inpainting", IEEE Transactions on Circuits and Systems for Video Technology, vol. 17, No. 10, Oct. 1, 2007, pp. 1273-1287.

Takeshi Tsukuba et al. "*Adaptive Multidirectional Intra Prediction*", ITU-T SG16 Q6 Video Coding Experts Group, 33$^{rd}$ Meeting, Document VCEG-AG05, Oct. 20, 2007, pp. 1-6.

Taichiro Shiodera et al., "*Block Based Extra/Inter-Polating Prediction for Intra Coding*", IEEE International Conference on Image Processing 2007 (ICIP 2007), Sep. 1, 2007, pp. VI-445-VI-448.

C.A. Rothwell et al., "*Driving Vision by Topology*", Computer Vision, 1995, Proceedings., International Symposium on Coral Gables, FL, USA, Nov. 21, 1995, pp. 395-400.

Virginie Drugeon et al.,"*High Precision Edge Prediction for Intra Coding*", IEEE International Conf. on Image Processing (ICIP 2009), Oct. 12-15, 2008, pp. 1620-1623.

Feng Pan et al., "*Fast Mode Decision for Intra Prediction*", Joint Video Team (JVT) of ISO/IEC MPEG & ITU-T VCEG (ISO/IEC JTC1/SC29/WG11 and ITU-T SG16 Q.6), Document JVT-G013, Mar. 7, 2003, pp. 1-22.

Extended European Search Report issued on Nov. 13, 2008 in European Patent Application No. 08000979.8 which is the priority application of the present application.

ITU-T Recommendation H.264: Advanced video coding for generic audiovisual services, May 2003.

* cited by examiner

IMAGE CODING METHOD AND IMAGE DECODING METHOD FOR CODING AND DECODING IMAGE DATA ON A BLOCK-BY-BLOCK BASIS

TECHNICAL FIELD

The present invention relates to an image coding method for compression-coding image data and video data with improved coding efficiency, an image decoding method for reconstructing the image data and video data that have been compression-coded, and a corresponding image coding apparatus and image decoding apparatus.

BACKGROUND OF THE INVENTION

Background Art

An ever increasing number of applications for video-conferencing, digital video broadcasting, and streaming of video contents over the Internet such as for video-on-demand services relies on a transmission of video information. When video data is being transmitted or recorded, a substantial amount of data has to be sent through conventional transmission channels of limited bandwidth or has to be stored on conventional storage media of limited data capacity. In order to transmit video information through conventional channels and store it on storage media, it is inevitable to compress or reduce the volume of digital data.

For the compression of video data, a plurality of video coding standards has been developed. Such video standards are, for instance, ITU-T standards denoted with H.26x and ISO/IEC standards denoted with MPEG-x. The most up-to-date and advanced video coding standard is currently the standard denoted as H.264/MPEG-4 AVC (see Non-Patent Reference 1).

The coding approach underlying most of these standards is based on predictive coding including the following main stages (a) to (d):

(a) dividing video frames into blocks of pixels in order to subject each video frame to data compression on a block-by-block basis;

(b) identifying temporal and spatial redundancies by predicting the individual blocks from previously coded video data;

(c) removing the identified redundancies by subtracting the predicted data from the video data; and (d) compressing the remaining data by means of Fourier transformation, quantization, and entropy coding.

Current video coding standards differ in the prediction modes that are employed for predicting each macroblock. Most video coding standards use motion estimation and motion compensation to predict video data from previously coded and decoded frames (inter-frame prediction). Alternatively, block data may also be extrapolated from neighboring blocks of the same frame (intra-frame prediction). The H.264/AVC standard defines several intra-frame prediction modes that differ, for example, with respect to the reference pixels used for an extrapolation or with respect to the direction in which the pixels are extrapolated.

FIGS. 1A and 1B illustrate intra-prediction modes according to the H.264/AVC standard. As illustrated in FIG. 1A, a current block 10 of 4×4 pixels is predicted by extrapolating a set of thirteen reference pixels 20 located on and to the left of the current block 10 to be predicted. With this prediction, a predicted block corresponding to the current block 10 is generated. In order to perform the extrapolation, one out of 8 possible extrapolation directions (intra-prediction directions) shown in FIG. 18 may be selected. In addition, a DC-mode which employs a mean value of the reference pixels 20 for predicting the current block 10 may be selected.

In intra-frame prediction, spatial prediction on subblocks of sizes of 4×4, 8×8, or 16×16 pixels is performed in order to reduce the spatial redundancies existing in natural images. Pixel values of already coded surrounding blocks (pixel values of reference pixels) are used to predict the pixel values of the current block. These reference pixels are extrapolated according to predefined prediction modes. In H.264/AVC, there are 9 prediction modes for subblocks of 4×4 and 8×8 pixels, and 4 prediction modes for macroblocks of 16×16 pixels.

For subblocks smaller than 8×8 pixels, the 9 prediction modes include 8 prediction directions (cf. FIG. 1B), suitable for predicting directional structures, and a DC prediction mode. In the DC prediction mode, all pixels of the current block are predicted with a single value, which is the mean value of the surrounding reference pixels. In the directional modes, the reference pixels are repeated along the corresponding direction. According to the vertical mode, for example, reference pixels in a row immediately above the current block are vertically repeated (extrapolated). According to the horizontal mode, on the other hand, pixels in a column immediately to the left of the current block are horizontally repeated (extrapolated). The remaining modes are diagonal prediction modes derived in similar ways.

Non-Patent Reference 1: ISO/IEC 14496-10 "MPEG-4 Part 10 Advanced Video Coding"

SUMMARY OF THE INVENTION

However, when the current block includes a sharp linear edge and an appropriate predicted block cannot be generated in the conventional technique, there is a problem that an amount of coded data increases or distortion occurs in a coded image. The problem will be more specifically described hereinafter.

These conventional prediction directions are limited. In other words, the intra-prediction directions are limited to 8 directions as illustrated in FIG. 1B. Thus, intra prediction in 1 out of 8 directions can only be performed in the conventional technique.

If there is a sharp linear edge, an intra-prediction mode having an angle closest to the edge is selected from among the 8 directions illustrated in FIG. 1B, and the current block will be predicted by the selected prediction mode. However, when an angle of an intra-prediction mode is slightly different from the actual angle of the edge, the predicted block will include an edge along a direction different from a direction of the actual edge. Thus, a differential image computed by subtracting the predicted block from the current block has high frequency components that are the furthest from the reference pixels.

Since the high frequency components normally need many bits for coding, the amount of coded data increases. Alternatively, when the high frequency components are eliminated for suppressing the increased amount of coded data, distortion occurs in a coded image.

The object of the present invention is to solve the problem and provide an improved method and apparatus for coding and decoding image data and video data so that a higher coding efficiency can be achieved and the coded distortion can be reduced.

In order to solve the problem, the image coding method according to an aspect of the present invention is a method for coding image data on a block-by-block basis, and the method includes: partitioning the image data into a plurality of blocks; generating a predicted block by predicting a current block that is one of the plurality of blocks; computing a difference between the current block and the predicted block; coding the difference computed in the computing; decoding the difference coded in the coding; and adding the difference decoded in the decoding to the predicted block to generate a decoded block, wherein the generating includes: detecting an edge in a previously decoded block corresponding to a block adjacent to the current block; and extrapolating or interpolating previously decoded image data along a direction of the edge detected in the detecting to generate the predicted block, the previously decoded image data corresponding to a pixel included in the block adjacent to the current block.

Thereby, a predicted block can be generated using a direction of the edge detected from the surrounding blocks of the current block, as a prediction direction. Thus, when the current block includes a sharp edge, a more suitable predicted block than the predicted block generated using the conventional predetermined directional prediction modes can be generated. Since the prediction residual that is a difference between the current block and the predicted block contains less information, the coded distortion can be reduced and higher coding efficiency can be achieved.

Furthermore, the previously decoded image data may be linearly extrapolated or interpolated in the extrapolating or interpolating to generate the predicted block.

Furthermore, a weighted sum of at least 2 pixel values of a plurality of decoded pixels included in the previously decoded image data may be computed for each predicted pixel included in the predicted block, the computed weighted sum may be extrapolated or interpolated to generate the predicted block in the extrapolating or interpolating, and weights for computing the weighted sum may be determined according to the direction of the edge detected in the detecting.

Thereby, a suitable predicted value can be computed by computation of a weighted sum of adjacent pixels even when there is no integer pixel that crosses a predicted pixel subject to the computation of the predicted value and is on an extension of the detected edge.

Furthermore, each of the weights may be determined according to the position of the predicted pixel. More specifically, a larger value may be assigned to each of the weights, as a distance from one of the plurality of decoded pixels to be used for generating the predicted block, to one of the predicted pixels is smaller.

Furthermore, at least 2 edges having directions different from each other may be detected in the detecting, the pixel values of the plurality of decoded pixels for extrapolation or interpolation along the directions of the at least 2 edges may be combined for each of the predicted pixels, and the combined pixel values may be extrapolated or interpolated to generate the predicted block in the extrapolating or interpolating.

Thereby, even when edges are detected from the surrounding blocks of the current block, a suitable predicted value can be computed by computation of predicted values along the respective directions of the edges.

Furthermore, the weighted sum may be computed for each of the predicted pixels by multiplying each of the weights by a corresponding one of the pixel values of the plurality of decoded pixels, the computed weighted sum may be extrapolated or interpolated to generate the predicted block in the extrapolating or interpolating, and a larger value may be assigned to each of the weights, as a distance from one of the plurality of decoded pixels to the previously decoded block in which one of the at least 2 edges is detected is smaller, the plurality of decoded pixels respectively corresponding to the weights.

Furthermore, a larger value may be assigned to each of the weights, as a distance from one of the plurality of decoded pixels to an extension of one of the at least 2 edges is smaller, the plurality of decoded pixels respectively corresponding to the weights.

Furthermore, the generating may further include selecting one of a plurality of prediction modes including an edge prediction mode, and when the edge prediction mode is selected, the previously decoded image data may be extrapolated or interpolated along the direction of the edge detected in the detecting to generate the predicted block in the extrapolating or interpolating.

Thereby, when the edge is detected, the edge prediction mode can be implemented in which data is extrapolated or interpolated along a direction of the detected edge. When no edge is detected, a standard prediction mode can be implemented.

Furthermore, the plurality of prediction modes may further include a DC prediction mode and a plurality of directional prediction modes that have been predefined, and in the extrapolating or interpolating, pixel values of the previously decoded image data may be averaged to generate the predicted block when the DC prediction mode is selected, and the previously decoded image data may be extrapolated along a direction corresponding to a selected one of the plurality of directional prediction modes to generate the predicted block, when the one of the plurality of directional prediction modes is selected.

Furthermore, in the selecting: (i) one of the edge prediction modes and the plurality of directional prediction modes may be selected when the edge is detected in the detecting; and (ii) one of the DC prediction mode and the plurality of directional prediction modes may be selected when the edge is not detected in the detecting.

Thereby, the optimal prediction modes, namely, the edge prediction mode and the conventional directional prediction modes can be selected as candidates for the prediction modes to be used when the edge is detected, and the optimal prediction modes, namely, the DC prediction mode and the conventional directional prediction modes can be selected as candidates for the prediction modes to be used when the edge is not detected. Here, when an edge is detected, it is unlikely that the current block is flat, and usually, a difference between the predicted block generated in the DC prediction mode and the current block contains lots of information. Thus, the coding efficiency with the DC prediction mode is low, and the DC prediction mode is hardly used when the edge is detected. Accordingly, the DC prediction mode can be eliminated from a candidate for the prediction modes.

Furthermore, in the coding: (i) when one of the plurality of directional prediction modes is selected in the selecting, a mode indicator indicating the selected one of plurality of directional prediction modes may be coded; and (ii) when one of the DC prediction mode and the edge prediction mode is selected, a mode indicator indicating the selected one of the DC prediction mode and the edge prediction mode may be coded.

Since information indicating the conventional DC prediction mode can be used as information indicating the edge prediction mode, information indicating the edge prediction mode does not have to be newly coded, and thus higher coding efficiency can be achieved. As described above, it is unlikely that the DC prediction mode is selected in the case where the edge prediction mode can be selected, such as a case where an edge is detected. Furthermore, it is unlikely that the edge prediction mode is selected when the DC prediction mode can be selected. Since there is hardly a case where both the edge prediction mode and the DC prediction mode are necessary as candidates for the prediction modes, information indicating the DC prediction mode can be assigned as information indicating the edge prediction mode.

Furthermore, in the selecting: one of the edge prediction mode and the plurality of directional prediction modes may be selected when the edge is detected in the detecting and the direction of the edge detected in the detecting points to the current block; and one of the DC prediction mode and the plurality of directional prediction modes may be selected when (i) the edge is not detected in the detecting, or (ii) the edge is detected in the detecting and the direction of the edge detected in the detecting does not point to the current block.

Furthermore, the detecting may include: computing a gradient vector for each of a plurality of pixels included in the previously generated (coded and decoded) decoded block corresponding to the block adjacent to the current block; determining whether at least one of the gradient vectors computed in the computing satisfies conditions that (i) a norm of the at least one of the gradient vectors exceeds a predetermined threshold and (ii) a vector having a direction perpendicular to a direction of the at least one of the gradient vectors points to the current block; and detecting an edge having the direction perpendicular to the direction of at least one of the gradient vectors when the at least one of the gradient vectors computed in the computing satisfies the conditions in the determining.

Since the edge can be detected using not the current block but blocks surrounding the current block, there is no need to transmit, to a decoder, information necessary for the edge prediction mode, such as information indicating a direction of the edge. Thus, higher coding efficiency can be achieved.

Furthermore, in the detecting of the edge having the direction, the direction of the edge may be determined based on a direction of a gradient vector having a largest norm, the gradient vector corresponding to one of the at least one of the gradient vectors satisfying the conditions.

Furthermore, in the detecting of the edge having the direction, the direction of the edge may be determined based on a direction obtained by averaging directions of the at least one of the gradient vectors satisfying the conditions.

Furthermore, the image decoding method according to an aspect of the present invention is a method for decoding image data including a coded prediction residual on a block-by-block basis, and the method includes: decoding the prediction residual of a current block; generating a predicted block by predicting the current in block; and adding the predicted block generated in the generating to the prediction residual decoded in the decoding to generate a decoded block, wherein the generating includes: detecting an edge in a previously decoded block corresponding to a block adjacent to the current block; and extrapolating or interpolating previously decoded image data along a direction of the edge detected in the detecting to generate the predicted block, the previously decoded image data corresponding to a pixel included in the block adjacent to the current block.

Thereby, a predicted block can be generated using a direction of the edge detected from the surrounding blocks of the current block, as a prediction direction. Thus, when the current block includes a sharp edge, a more suitable predicted block than the predicted block generated using the conventional predetermined directional prediction modes can be generated. Since the prediction residual that is a difference between the current block and the predicted block contains less information, the coded distortion can be reduced.

Furthermore, a weighted sum of at least 2 pixel values of a plurality of decoded pixels included in the previously decoded image data may be computed for each predicted pixel included in the predicted block, the computed weighted sum may be extrapolated or interpolated to generate the predicted block in the extrapolating or interpolating, and weights for computing the weighted sum may be determined according to the direction of the edge detected in the detecting.

Thereby, a suitable predicted value can be computed by computation of a weighted sum of adjacent pixels even when there is no integer pixel that crosses a predicted pixel subject to the computation of the predicted value and is on an extension of the detected edge.

Furthermore, at least 2 edges having directions different from each other may be detected in the detecting, the pixel values of the plurality of decoded pixels for extrapolation or interpolation along the directions of the at least 2 edges may be combined for each of the predicted pixels, and the combined pixel values may be extrapolated or interpolated to generate the predicted block in the extrapolating or interpolating.

Thereby, even when edges are detected from the surrounding blocks of the current block, a suitable predicted value can be computed by computation of predicted values along the respective directions of the edges.

Furthermore, the generating may further include selecting one of a plurality of prediction modes including an edge prediction mode, and when the edge prediction mode is selected, the previously decoded image data may be extrapolated or interpolated along the direction of the edge detected in the detecting to generate the predicted block in the extrapolating or interpolating.

Thereby, when the edge is detected, the edge prediction mode can be implemented in which data is extrapolated or interpolated along a direction of the detected edge. When the edge is not detected, the standard prediction mode can be implemented.

Furthermore, in the selecting: (i) one of the edge prediction mode and the plurality of directional prediction modes may be selected when the edge is detected in the detecting; and (ii) one of the DC prediction mode and the plurality of directional prediction modes may be selected when the edge is not detected in the detecting.

Thereby, the optimal prediction modes, namely, the edge prediction mode and the conventional directional prediction modes can be selected as candidates for the prediction modes to be used when the edge is detected, and the optimal prediction modes, namely, the DC prediction mode and the conventional directional prediction modes can be selected as candidates for the prediction modes to be used when the edge is not detected.

Furthermore, the image data may further include a prediction mode indicator indicating a prediction mode, and (ii) in the selecting, the edge prediction mode may be selected when the prediction mode indicator indicates one of the DC prediction mode and the edge prediction mode and the edge is detected in the detecting, and the DC prediction mode may be selected when the edge is not detected in the detecting.

Since a bitstream coded using information indicating the conventional DC prediction mode as information indicating the edge prediction mode can be accurately decoded, the information indicating the edge prediction mode does not have to be newly coded, and higher coding efficiency can be achieved.

Furthermore, the detecting may include; computing a gradient vector for each of a plurality of pixels included in the previously decoded block corresponding to the block adjacent to the current block; determining whether at least one of the gradient vectors computed in the computing satisfies conditions that (i) a norm of the at least one of the gradient vectors exceeds a predetermined threshold and (ii) a vector having a direction perpendicular to a direction of the at least one of the gradient vectors points to the current block; and detecting an edge having the direction perpendicular to the direction of at least one of the gradient vectors when the at least one of the gradient vectors computed in the computing satisfies the conditions in the determining.

Since the edge can be detected using not the current block but blocks surrounding the current block, the bitstream can be accurately decoded without transmission, from an encoder, information necessary for the edge prediction mode, such as information indicating a direction of the edge.

An aspect of the present invention is not only implemented as an image coding method and an image decoding method but also as an image coding apparatus and an image decoding apparatus using respective steps included in the image coding method and image decoding method as processing units. Furthermore, these steps may be implemented as a program causing a computer to execute such steps. Furthermore, another aspect of the present invention can be implemented as a recording medium that records the program, such as a computer-readable CD-ROM, and as information, data, or a signal that indicates the program. Furthermore, these program, information, data, and signal may be distributed through a communication network, such as the Internet.

A part or all of the constituent elements included in the respective image coding apparatus and image decoding apparatus may be configured from a single System Large-Scale Integration (LSI). The System LSI is a super-multi-function LSI manufactured by integrating constituent units on one chip, and is specifically a computer system configured by including a microprocessor, a ROM, a RAM, and so on.

According to an aspect of the present invention, the current block can be accurately predicted. Thus, the coded distortion can be reduced and higher coding efficiency can be achieved.

NUMERICAL REFERENCES

Figure 1A:
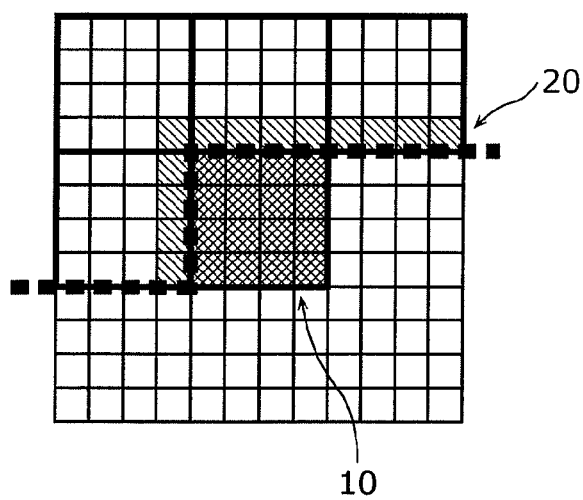
FIG. 1A illustrates an example of a relationship between reference pixels and the current block in which intra prediction is employed according to the conventional H.264/AVC standard.

10 Current block
20 Reference pixel
30 Surrounding block
40, 41, 61, 62 Edge
50, 51, 52, 65, 66 Edge direction
63, 64 Current pixel
71, 72 Pixel group
100, 500 Image coding apparatus
101, 304 Frame memory
102 Subtracting unit
103 Frequency transform unit
104 Quantization unit
105, 505 Variable length coding unit
106, 301 Inverse quantization unit
107, 302 Inverse frequency transform unit
108, 303 Adding unit
109, 509 Reference picture memory
110, 510 Intra-prediction mode determination unit
111 Motion estimation unit
112, 305 Intra-prediction unit 113, 306 Motion compensation unit
114, 115, 308, 309 Switch
116, 307 Control unit
117 Probability table holding unit
118 Coding mode determination unit
120 Differential coding unit
130 Differential decoding unit
201, 401 Edge detection unit
202, 402 Direction determination unit
203, 403 Norm determination unit
204 Prediction mode set determination unit
205 Prediction mode selection unit
300 Image decoding apparatus
404 Prediction mode determination unit
405 Predicted block generation unit
519 Threshold determination unit

DETAILED DESCRIPTION OF THE INVENTION

The image coding apparatus and image decoding apparatus according to an embodiment can detect an edge included in surrounding blocks of the current block, and allow the use of an edge prediction mode in which a direction of the detected edge is used as an intra-prediction direction. In other words, the embodiment makes it possible to perform intra-prediction coding on a picture including a sharp edge by taking the direction of the detected edge into accounts.

Figure 2:
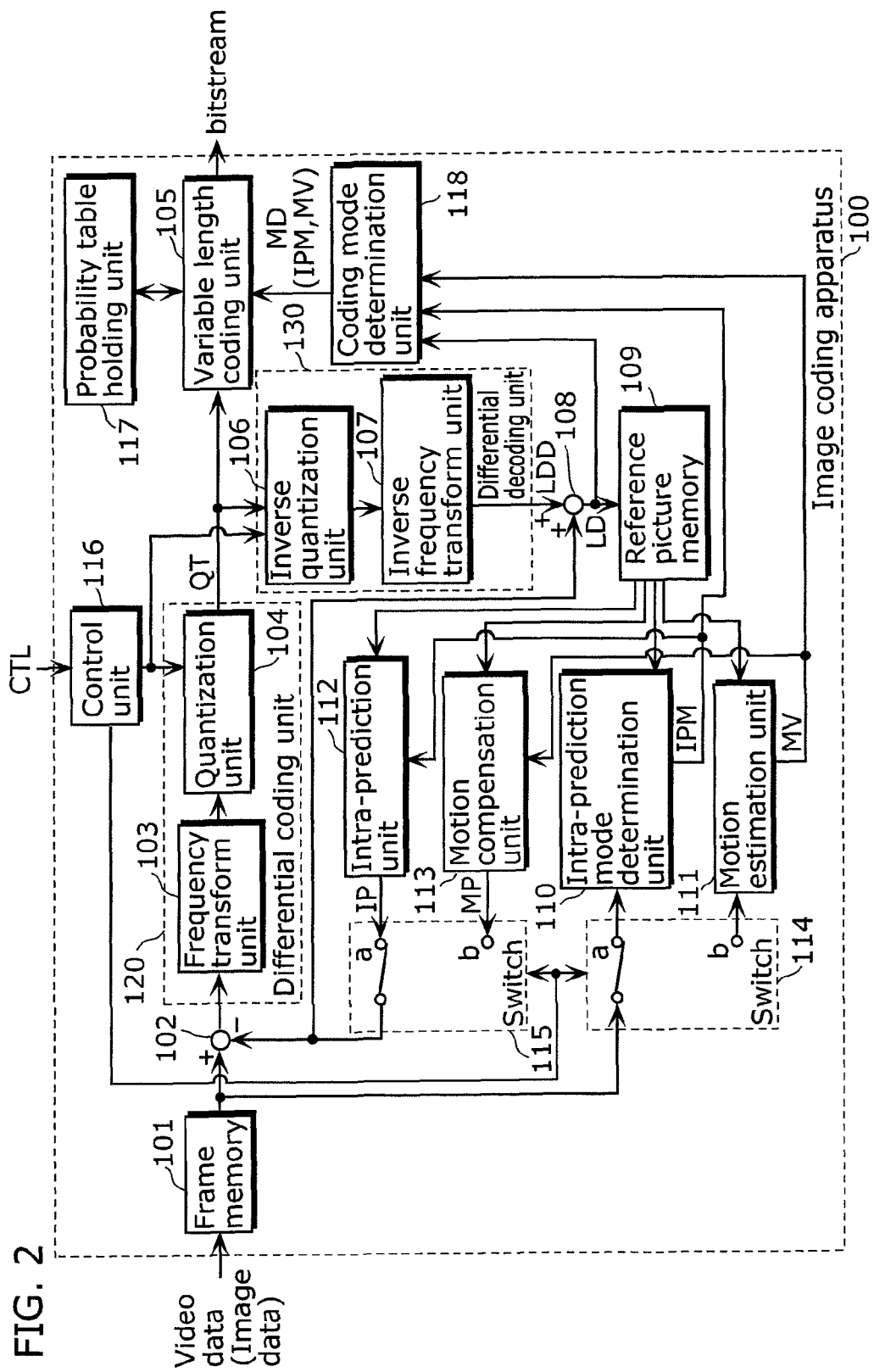
FIG. 2 is a block diagram illustrating an example of a configuration of an image coding apparatus with hybrid coding scheme of an embodiment.

FIG. 2 is a block diagram illustrating an example of a configuration of an image coding apparatus 100 for hybrid video coding according to the embodiment. The image coding apparatus 100 includes a frame memory 101, a subtracting unit 102, a frequency transform unit 103, a quantization unit 104, a variable length coding unit 105, an inverse quantization unit 106, an inverse frequency transform unit 107, an adding unit 108, a reference picture memory 109, an intra-prediction mode determination unit 110, a motion estimation unit 111, an intra-prediction unit 112, a motion compensation unit 113, switches 114 and 115, a control unit 116, a probability table holding unit 117, and a coding mode determination unit 118. As illustrated in FIG. 2, the frequency transform unit 103 and the quantization unit 104 are included in a differential coding unit 120. Furthermore, the inverse quantization unit 106 and the inverse frequency transform unit 107 are included in a differential decoding unit 130.

Processes for each processing unit will be described along with operations when the image coding apparatus 100 codes input video data made up of frames.

Each picture of the input video data is stored in the frame memory 101, divided into blocks, and then outputted from the frame memory 101 on a block-by-block basis (e.g. in units of macroblocks having horizontal 16 pixels and vertical 16 pixels). Here, the input video data may be in a progressive mode and an interlaced mode.

Each macroblock can be coded either in intra- or in inter-prediction mode. First, a case where the current block is coded in intra-prediction mode will be described.

In case of an intra-prediction mode (intra-frame prediction), the macroblock outputted from the frame memory 101 is inputted to the intra-prediction mode determination unit 110 (a switch 114 is connected to a terminal "a" by the control unit 116). The intra-prediction mode determination unit 110 determines how to perform intra prediction on the inputted macroblock. More specifically, as an intra-prediction mode (IPM), it is necessary to determine an intra predicted block size (one of the following sizes: horizontal 4 pixels×vertical 4 pixels; horizontal 8 pixels×vertical 8 pixels; and horizontal 16 pixels×vertical 16 pixels), and an intra-prediction direction.

The detailed configuration of the intra-prediction mode determination unit 110 will be described later with reference to FIG. 3.

A current block 10 (horizontal 4 pixels×vertical 4 pixels) in FIG. 1A may for instance be predicted according to 8 pre-defined intra-prediction directions using reference pixels 20. Here, it is assumed that the reference pixels 20 (diagonally hatched squares in FIG. 1A) to be used for the intra-prediction have already been coded and decoded, and stored in the reference picture memory 109. Information indicating the determined intra-prediction mode IPM is outputted to the intra-prediction unit 112 and the coding mode determination unit 118.

The intra-prediction unit 112, based on the intra-prediction mode IPM determined by the intra-prediction mode determination unit 110, obtains reference pixels to be used for intra prediction (intra reference pixels) from the reference picture memory 109, generates an intra-predicted image IP by extrapolating or interpolating pixel values of the reference pixels, and outputs the generated intra-predicted image IP to the subtracting unit 102 (a switch 115 is connected to a terminal "a" by the control unit 116).

The subtracting unit 102 receives (i) a macroblock (current macroblock) of an input picture included in the input video data from the frame memory 101 and (ii) the intra-predicted image IP generated by the intra-prediction unit 112, generates a differential image by computing a difference (also referred to as prediction residual) between the current macroblock and the intra-predicted image IP, and outputs the differential image to the frequency transform unit 103.

The frequency transform unit 103 performs a frequency transformation, such as a discrete cosine transformation, on the differential image generated by the subtracting unit 102, generates frequency transform coefficients, and outputs the generated frequency transform coefficients.

The quantization unit 104 quantizes the frequency transform coefficients generated by the frequency transform unit 103, and outputs quantized frequency transform coefficients QT. Here, the quantization is a process for dividing the frequency transform coefficients by a predetermined value (quantization step). It is assumed that this quantization step is given by the control unit 116 (the quantization step may be included in a control signal CTL to be inputted to the control unit 116). The quantized frequency transform coefficients QT are outputted to the variable length coding unit 105 and the inverse quantization unit 106.

The inverse quantization unit 106 inverse-quantizes the quantized frequency transform coefficients QT, and outputs the inverse-quantized frequency transform coefficients to the inverse frequency transform unit 107. Here, a quantization step identical to the quantization step used for the quantization by the quantization unit 104 is fed from the control unit 116 to the inverse quantization unit 106.

The inverse frequency transform unit 107 generates a decoded differential image LDD by inverse-frequency transforming the inverse-quantized frequency transform coefficients. The inverse frequency transform unit 107 outputs the generated decoded differential image LDD to the adding unit 108.

The adding unit 108 generates a decoded image LD by adding the decoded differential image LDD to one of the predicted image IP and a predicted image MP, and stores the decoded image LD in the reference picture memory 109. The decoded image LD stored in the reference picture memory 109 is used in a later coding as a reference picture.

The variable length coding unit 105 performs variable length coding on (i) the quantized frequency transform coefficients QT inputted from the quantization unit 104 and (ii) information indicating the intra-prediction mode IPM inputted from the intra-prediction mode determination unit 110 through the coding mode determination unit 118, and outputs a bitstream which is also referred to as a code sequence.

Here, among the variable length coding methods used in the variable length coding unit 105, there is a context adaptive arithmetic coding method used in the international standard H.264 for coding moving pictures. The context adaptive arithmetic coding method is a method for switching probability tables used for arithmetic coding according to variable length coding target data and data on which the variable length coding has already been performed (context adaptation). For example, a block size for intra prediction, a block size for frequency transformation, and the like are used as a context for performing variable length coding on the quantized frequency transform coefficients QT. Here, it is assumed that the probability tables are held in the probability table holding unit 117.

Next, a case where the current macroblock is coded in inter-prediction mode will be described.

In case of inter-prediction mode (inter-frame prediction), the macroblock outputted from the frame memory 101 is inputted to the motion estimation unit 111 (the switch 114 is connected to a terminal "b" by the control unit 116). The motion estimation unit 111 estimates a motion (motion vector) of the inputted macroblock with respect to the reference picture (a reconstructed picture that is held in the reference picture memory 109 and is different from the picture to be coded). In the motion estimation, generally the following motion vector is selected: a motion vector having a minimum differential value between the block to be coded and a predicted image, and having a minimum sum of weights for a coded amount of the motion vector. The estimated motion vector is outputted to the motion compensation unit 113 and the coding mode determination unit 118.

The motion compensation unit 113 obtains reference pixels used in inter prediction (inter reference pixels) from the reference picture memory 109, based on the motion vector determined by the motion estimation unit 111. Then, the motion compensation unit 113 generates a predicted image MP, and outputs the predicted image MP to the subtracting unit 102 (the switch 115 is connected to a terminal "b" by the control unit 116).

The processes performed by the subtracting unit 102, the frequency transform unit 103, the quantization unit 104, the inverse quantization unit 106, the inverse frequency transform unit 107, and the adding unit 108 are the same as the processes described in the case of intra prediction. Thus, the explanation about the processes is omitted here.

The coding mode determination unit 118 determines a coding mode of a macroblock to be coded, using outputs from the intra-prediction mode determination unit 110, motion estimation unit 111, quantization unit 104, frame memory 101, and adding unit 108, and the like. Here, it is determined which one of the intra-picture prediction coding and the inter-picture prediction coding is used for coding the macroblock to be coded. The coding mode determination unit 118 determines, in general, a coding mode having the smallest value of a sum of weights between an amount of bits to be generated and coded distortion. In the case where the intra-picture prediction coding is selected as the coding mode, the coding mode determination unit 118 outputs a coding mode MD and information indicating the intra-prediction mode IPM (such as a block size for intra prediction and an intra-prediction direction) to the variable length coding unit 105. In the case where the inter-picture prediction coding is selected as a coding mode, the coding mode determination unit 118 outputs a motion vector MV and the coding mode MD to the variable length coding unit 105.

For example, a cost function using a bitrate and coded distortion that are of the standard H.264 may be used to determine the best prediction mode for coding the current block. The differential image is orthogonally transformed, quantized, and variable-length coded for each prediction mode. Then, a bitrate and resulting coded distortion for each prediction mode are computed. For example, the Lagrangian cost function J is used as a cost function.

$$J = D + \lambda \cdot R \qquad \text{[Equation 1]}$$

In Equation 1, R denotes a bitrate used to code a differential image (also referred to as prediction residual) and prediction mode information. D denotes the coded distortion, and λ denotes the Lagrangian multiplier computed according to a quantization parameter QP chosen for the coding. The prediction mode with the lowest cost function J is chosen to predict the current block.

Here, the coding mode determination unit 118 includes a memory for temporarily storing the cost function to determine the best prediction mode.

The variable length coding unit 105 performs variable length coding on quantized frequency transform coefficients QT inputted from the quantization unit 104, and the coding mode MD and the intra-prediction mode IPM or the motion vector MV that are outputted from the coding mode determination unit 118, and outputs a bitstream.

Here, in the case where the variable length coding unit 105 codes the motion vector MV using the context adaptive arithmetic coding method, a method for changing a probability table depending on each size (context) of the motion vectors of coded surrounding blocks can be used. Here, probability tables are held in the probability table holding unit 117.

A prediction mode contains a full set of information that is required by a decoder (for example, an image decoding apparatus 300 to be described later and see FIG. 5) to reproduce the prediction performed by an encoder (image coding apparatus 100) in the process for coding video data. Therefore, a prediction mode defines the coding mode for each macroblock, i.e., whether intra or inter prediction is applied. Further, the prediction mode includes information on how the macroblock is subdivided. According to H.264/AVC, a macroblock made up of 16×16 pixels may, for instance in case of intra prediction, be further subdivided into blocks of 8×8 or 4×4 pixels each.

Depending on a coding mode, the prediction mode further includes information for specifying (i) a set of motion vectors employed for motion compensation or (ii) the intra-prediction mode applied to intra-predict the current block.

Next, a detailed configuration of the intra-prediction mode determination unit 110 according to the embodiment will be described with reference to FIG. 3.

Figure 3:
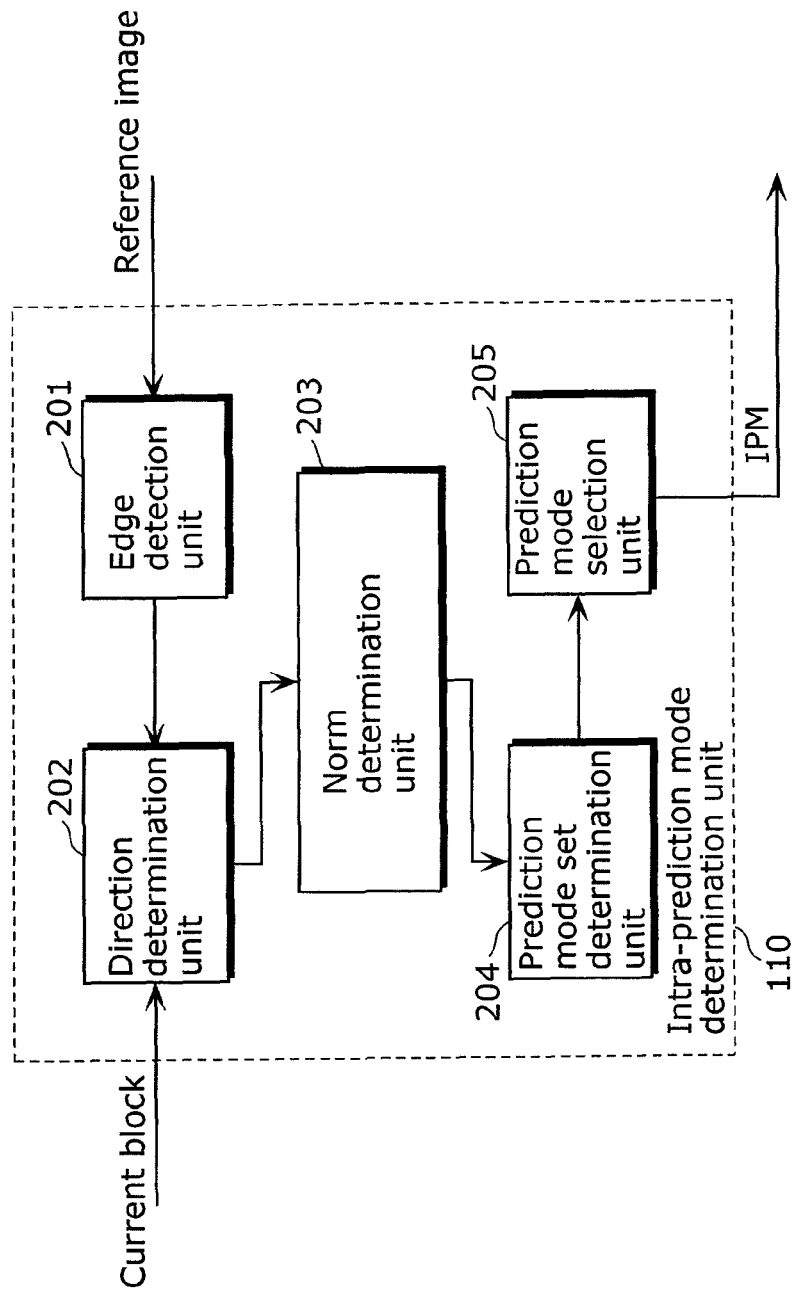
FIG. 3 illustrates detailed configuration of the intra-prediction mode determination unit included in the image coding apparatus according to the embodiment.

FIG. 3 is a block diagram illustrating a detailed configuration of the intra-prediction mode determination unit 110. As illustrated, the intra-prediction mode determination unit 110 includes an edge detection unit 201, a direction determination unit 202, a norm determination unit 203, a prediction mode determination unit 204, and a prediction mode selection unit 205.

The edge detection unit 201 reads a reference image from the reference picture memory 109, and detects an edge included in the read reference image. For example, the edge detection unit 201 computes a gradient vector field of the reference image, evaluates a norm of gradients which reach a maximum value of an edge. A direction of the edge is obtained from a vector that is perpendicular to a direction of a corresponding gradient.

A reference image for the edge detection is made up of pixels included in a block that has already been coded and decoded, out of pixels belonging to blocks directly adjacent to the current block. Gradient values are computed in the neighboring pixels using the vertical and horizontal Sobel operators as expressed in the following Equation 2.

$$Sobel_x = \begin{bmatrix} -1 & 0 & 1 \\ -2 & 0 & 2 \\ -1 & 0 & 1 \end{bmatrix}, Sobel_y = \begin{bmatrix} -1 & -2 & -1 \\ 0 & 0 & 0 \\ 1 & 2 & 1 \end{bmatrix} \quad \text{[Equation 2]}$$

The edge detection unit 201 computes a magnitude of a gradient (gradient value) of a corresponding pixel in a horizontal direction and a vertical direction for each pixel, using the vertical and horizontal Sobel operators. The direction of the corresponding gradient is determined for each pixel by combining vectors of gradient values in the computed horizontal direction and vertical direction.

Figure 4:
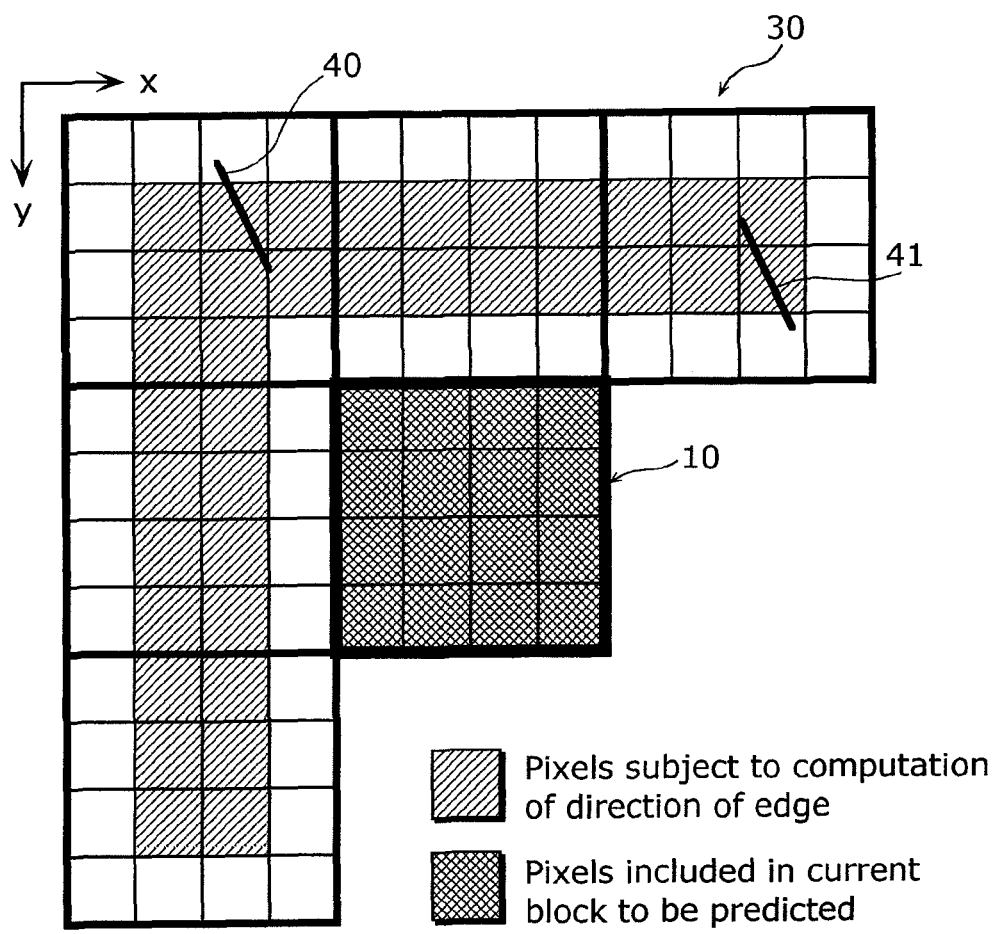
FIG. 4 is a schematic drawing illustrating a method for detecting an edge and estimating a direction of the detected edge.

FIG. 4 is a schematic drawing illustrating a method for detecting an edge and estimating a direction of the detected edge. A region left-diagonally hatched represents pixels of surrounding blocks 30 that are considered for computing gradients. The edge detection unit 201 computes a gradient value for each pixel left-diagonally if hatched in FIG. 4, using Equation 2, computes a direction of a gradient using the computed gradient value, and determines a direction perpendicular to the computed direction as a direction of the edge. A vector of the direction perpendicular to the direction of the gradient is also referred to as an edge vector. Here, a norm of the edge vector is, for example, the same as a norm of a gradient vector of a pixel having the edge vector detected.

With reference to FIG. 3, the direction determination unit 202 determines whether or not the direction of the edge detected by the edge detection unit 201 points to the current block for intra prediction. When an edge 40 in FIG. 4 is detected, for example, an extension of the edge 40 crosses pixels belonging to the current block 10. Thus, the direction determination unit 202 determines that the edge 40 points to the current block 10 for intra prediction. In contrast, when an edge 41 in FIG. 4 is detected, an extension of the edge 41 does not cross any pixel belonging to the current block 10. Thus, the direction determination unit 202 determines that the edge 41 does not point to the current block 10 for intra prediction.

The norm determination unit 203 computes a norm of an edge determined by the direction determination unit 202 as pointing to the current block for intra prediction, and determines whether or not the computed norm is larger than a predetermined threshold. The norm of an edge is a norm of an edge vector or a gradient vector. The norm determination unit 203 determines that the edge is detected when the computed norm is larger than the predetermined threshold. Furthermore, the norm determination unit 203 determines that the edge is not detected when the computed norm is not more than the predetermined threshold. The threshold used herein is empirically selected, for example, by comparing differences between different norms of maximum vectors and between different sequences including both sharp edges and smooth areas.

The prediction mode set determination unit 204 determines a prediction mode set for use in coding the current block, depending on whether or not an edge is detected. More specifically, the prediction mode set determination unit 204 determines either a prediction mode set including the conventional DC prediction mode and the 8 prediction direction modes to conventional prediction mode set) or a prediction made set including the edge prediction mode and the 8 prediction direction modes (a new prediction mode set).

When a norm of an edge vector is not more than the predetermined threshold, the prediction mode set determination unit 204 determines the conventional prediction mode set including the 9 prediction modes for use in H.264/AVC video coding standard, as an available prediction mode set.

When a norm of an edge vector (or gradient vector) is larger than the predetermined threshold, the edge is detected. Thus, the prediction mode set determination unit 204 determines the new prediction mode set as an available prediction mode set. When the edge is detected, the DC prediction mode is probably not a good candidate for predicting the current block, because the block is likely to contain a strong directional structure. Accordingly, the DC prediction mode is replaced with the edge prediction mode. The remaining 8 directional prediction modes of the H.264 video coding standard, however, are held. Such prediction modes are especially useful when a change in the edge direction occurs between the previous block (block from which an edge is detected) and the current block.

The prediction mode selection unit 205 selects a prediction mode out of the prediction mode set determined by the prediction mode set determination unit 204.

As described above, the image coding apparatus 100 of the embodiment includes the new edge prediction mode as a prediction mode to be selected when the current block is coded. Furthermore, the image coding apparatus 100 detects an edge from blocks surrounding the current block for intra-coding the current block according to the edge prediction mode, and performs intra-prediction coding using a direction of the detected edge as an intra-prediction direction. The specific operations of the image coding apparatus 100 of the embodiment will be described with reference to a flowchart later.

Next, a configuration of the image decoding apparatus 300 will be described.

Figure 5:
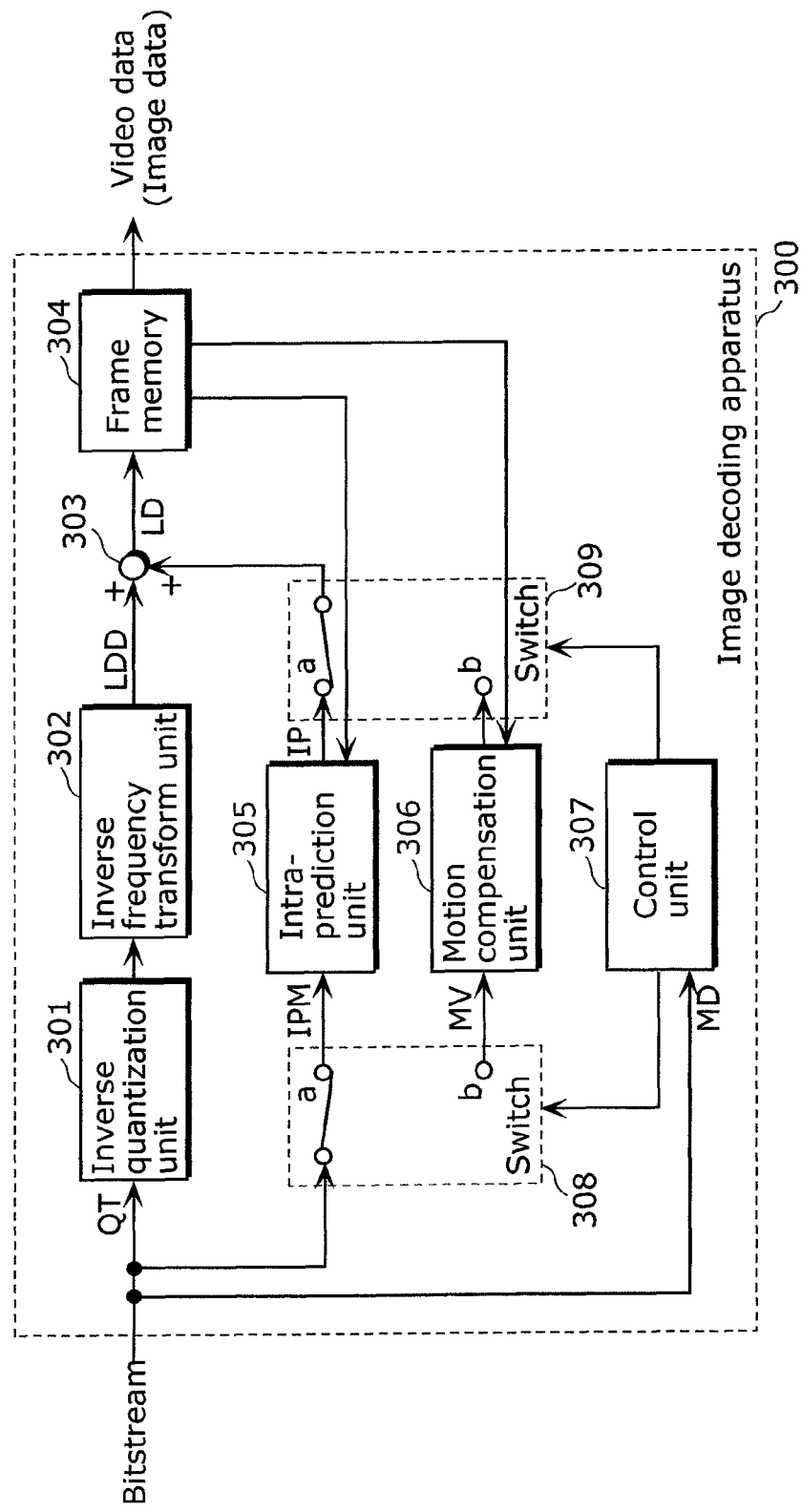
FIG. 5 is a block diagram illustrating an example of a configuration of the image decoding apparatus according to the embodiment.

FIG. 5 is a block diagram illustrating an example of the configuration of the image decoding apparatus 300 according to the embodiment. The image decoding apparatus 300 includes an inverse quantization unit 301, an inverse frequency transform unit 302, an adding unit 303, a frame memory 304, an intra-prediction unit 305, a motion compensation unit 306, a control unit 307, and switches 308 and 309.

The processes for each processing unit when the image decoding apparatus 300 decodes a bitstream (coded video data) will be described hereinafter. The image decoding apparatus 300 decodes the coded video data including a prediction residual for each block either as an intra- or inter-frame prediction coded block. The coding mode MD is inputted to the control unit 307, information indicating the intra-prediction mode IPM or the motion vector MV is inputted to the switch 308, and the quantized frequency transform coefficients QT are inputted to the inverse quantization unit 301.

The control unit 307 controls the switches 308 and 309 based on the coding mode MD. In the case where the coding mode MD indicates the intra-prediction coding, the switch 308 is connected to the terminal "a", and the information indicating the intra-prediction mode IPM is inputted to the intra-prediction unit 305. In the case where the coding mode MD indicates the inter-picture prediction coding, the switch 308 is connected to the terminal "b", and the motion vector MV is inputted to the motion compensation unit 306.

In the case where the current block is an intra-prediction coded block, the switches 308 and 309 are connected to the terminal "a". The information indicating the intra-prediction mode is thus inputted to the intra-prediction unit 305 and the quantized frequency transform coefficients QT are inputted to the inverse quantization unit 301. Here, the quantized frequency transform coefficients QT correspond to the prediction residual coded by an encoder (for example, image coding apparatus 100).

The intra-prediction unit 305, based on the inputted intra-prediction mode, obtains intra-predicted reference pixels from the frame memory 304, generates an intra-predicted image (predicted block), and outputs the intra-predicted image to the adding unit 301

The inverse quantization unit 301 inverse-quantizes the quantized frequency transform coefficients QT, and outputs the inverse-quantized frequency transform coefficients to the inverse frequency transform unit 302. The inverse-quantized frequency transform coefficients are further inverse-frequency transformed by the inverse frequency transform unit 302, and become a decoded differential image LDD. Then, the inverse frequency transform unit 302 outputs the decoded differential image LDD to the adding unit 303.

The decoded differential image LDD is added to the intra-predicted image IP by the adding unit 303 so as to generate a decoded image LD, and the decoded image LD is stored in the frame memory 304. The decoded image LD stored in the frame memory 304 is used as a reference picture for later decoding. In addition, it is outputted to form the decoded video data.

In the case where the current block is an inter predicted block, the switches 308 and 309 are connected to the terminal "b". The information indicating the motion vector MV is inputted to the motion compensation unit 306, and the quantized frequency transform coefficients QT are inputted to the inverse quantization unit 301.

The motion compensation unit 306, based on the inputted motion vector MV, obtains reference pixels from the frame memory 304, generates a predicted picture, and outputs the predicted picture to the adding unit 303.

The processes of the inverse quantization unit 301, inverse frequency transform unit 302, and adding unit 303 are the same as the processes explained in the case of intra predicted blocks. The decoded images LOS are stored in the frame memory 304. The decoded images stored in the frame memory 304 are used as reference pictures for later decoding. In addition, the decoded images are outputted to form the decoded video data.

Next, the detailed configuration of the intra-prediction unit 305 according to the embodiment will be described with reference to FIG. 6.

Figure 6:
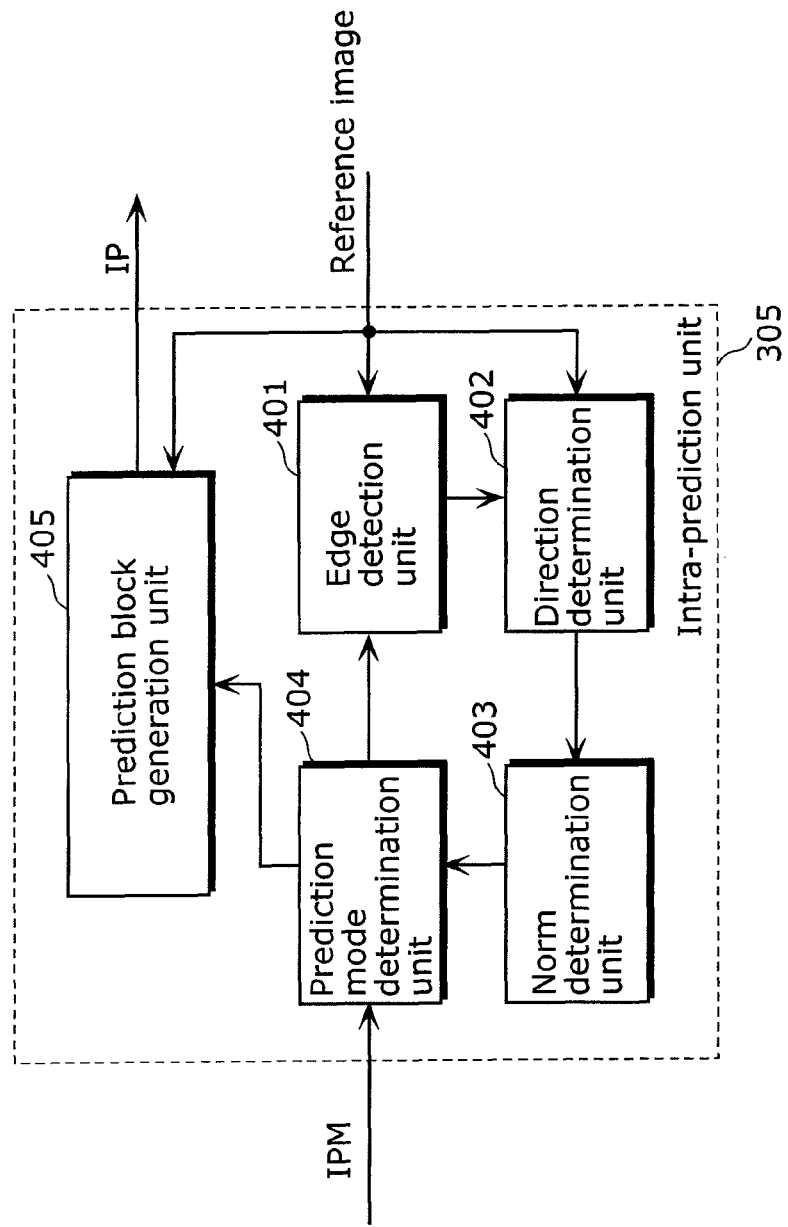
FIG. 6 illustrates an example of detailed configuration of an intra-prediction unit included in the image decoding apparatus according to the embodiment.

FIG. 6 is a block diagram illustrating an example of the detailed configuration of the intra-prediction unit 305 according to the embodiment. As illustrated in FIG. 6, the intra-prediction unit 305 includes an edge detection unit 401, a direction determination unit 402, a norm determination unit 403, a prediction mode determination unit 404, and a predicted block generation unit 405.

The edge detection unit 401 reads a reference image from the frame memory 304 when the prediction mode determination unit 404 determines one of the edge prediction mode and the DC prediction mode as the intra-prediction mode, and detects an edge included in the read reference image. The details of the edge detection are the same as those of the edge detection unit 201, and they will be described later.

The direction determination unit 402 determines whether or not the direction of the edge detected by the edge detection unit 401 points to the current block for intra prediction. The details of the edge direction determination processes are the same as those of the direction determination unit 202, and they will be described later.

The norm determination unit 403 computes a norm of an edge determined by the direction determination unit 402 as indicating the current block for intra prediction, and determines whether or not the computed norm is larger than a predetermined threshold. The predetermined threshold is preferably the same threshold for use in the norm determination process in coding the current block. Thus, when the threshold is not a value unique to the image decoding apparatus 300, the image coding apparatus 100 notifies the predetermined threshold. The details of the norm determination process are the same as those of the norm determination unit 203, and they will be described later.

The prediction mode determination unit 404 obtains information indicating the intra-prediction mode IPM included in the bitstream, and determines whether or not the intra-prediction mode IPM is one of the edge prediction mode and the DC prediction mode. The prediction mode determination unit 404 causes the edge detection unit 401 to detect an edge when the intra-prediction mode IPM is one of the edge prediction mode and the DC prediction mode. Then, the prediction mode determination unit 404 notifies the predicted block generation unit 405 whether the intra-prediction mode IPM is one of the edge prediction mode and the DC prediction mode, according to a result of the determination by the norm determination unit 403.

Figure 1B:
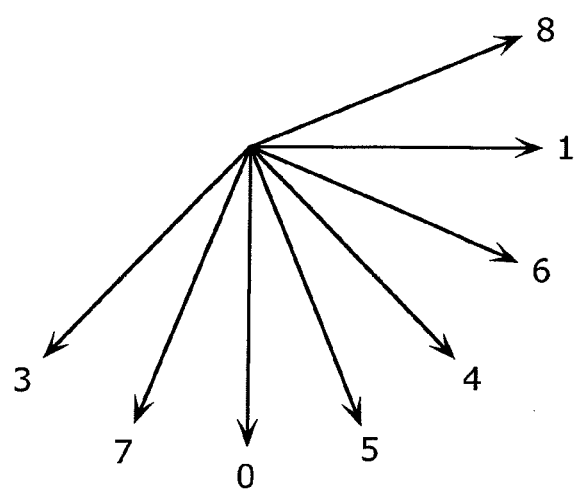
FIG. 1B illustrates prediction directions included in the intra-prediction mode set according to the conventional H.264/AVC standard.

When the intra-prediction mode IPM is neither the edge prediction mode nor the DC prediction mode, in other words, when the intra-prediction mode IPM is one of the conventional directional prediction modes (FIG. 1B), the prediction mode determination unit 404 notifies the predicted block generation unit 405 that the intra-prediction mode IPM is the directional prediction mode.

The predicted block generation unit 405 generates a predicted block according to the intra-prediction mode IPM notified by the prediction mode determination unit 404. More specifically, the predicted block generation unit 405 reads reference pixels from the frame memory 304, and generates a predicted block by extrapolating or interpolating the read reference pixels. The generated predicted block is outputted to the adding unit 303 through the switch 309.

As described above, the image decoding apparatus 300 of the embodiment includes the new edge prediction mode as a prediction mode to be selected when the current block is decoded. Furthermore, the image decoding apparatus 300 detects an edge from blocks surrounding the current block for decoding the current block according to the edge prediction mode, and performs intra-prediction coding using a direction of the detected edge as an intra-prediction direction. The specific operations of the image decoding apparatus 300 of the embodiment will be described with reference to a flowchart later.

Figure 7:
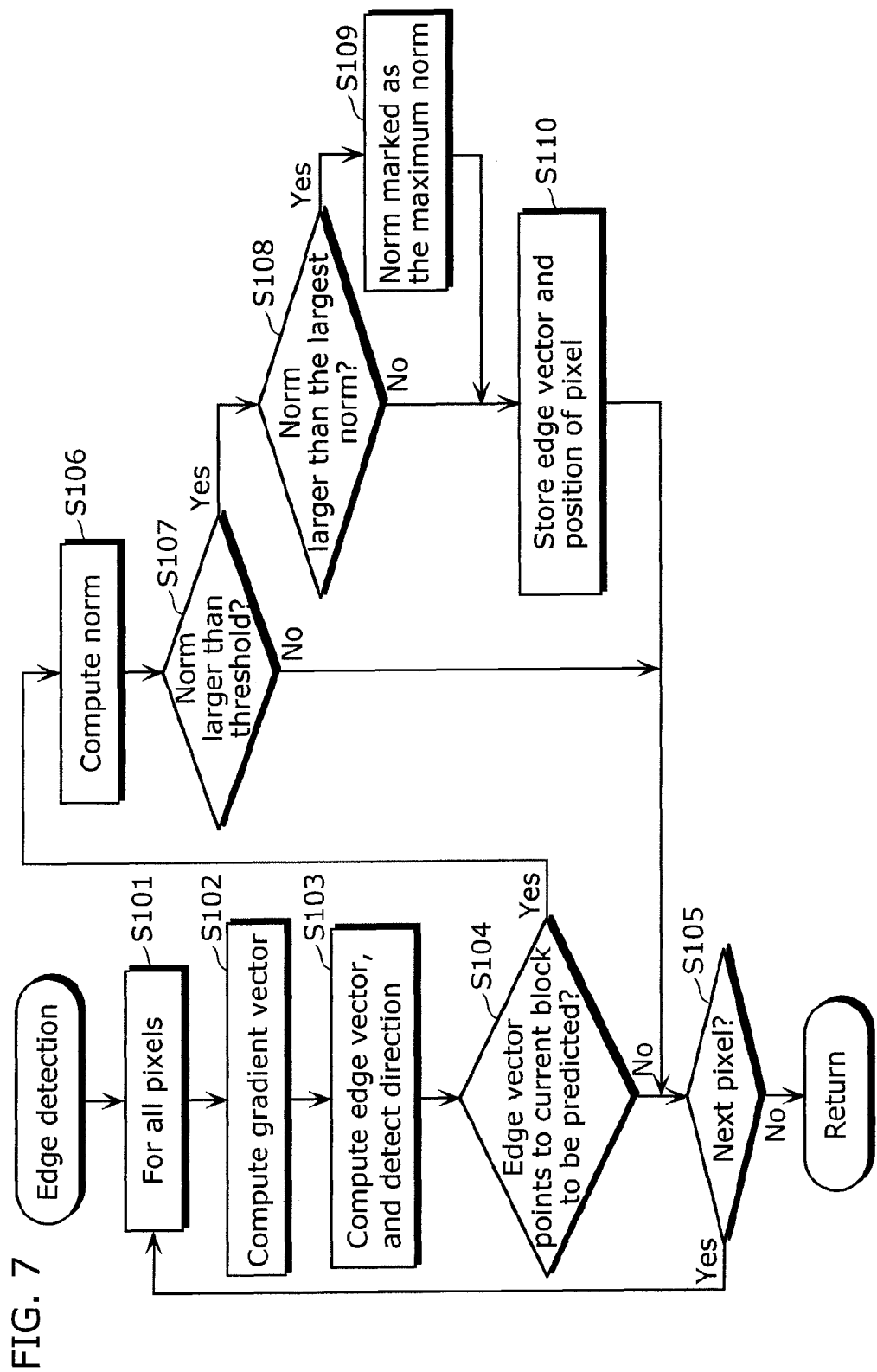
FIG. 7 is a flowchart illustrating edge detection according to the embodiment.

Next, the operations of the image coding apparatus 100 according to the embodiment will be described. First, edge detection will be described with reference to FIG. 7. FIG. 7 is a flowchart illustrating edge detection according to the embodiment.

The edge detection is performed on all pixels that are considered for computing gradients (pixels left-diagonally hatched in FIG. 4) (S101).

The edge detection unit 201 computes a gradient vector at a current pixel position by using the Sobel operators of Equation 2 (S102). The edge detection unit 201 computes an edge vector having a direction perpendicular to a direction of the computed gradient vector and detects the direction of the computed edge vector (S103).

Next, the direction determination unit 202 determines whether the gradient represents an edge that crosses the current block, i.e., whether the edge vector having the direction perpendicular to the direction of the computed gradient vector points to the current block to be predicted (S104). When the edge vector does not point to the current block to be predicted (No in S104) and there is a next pixel (Yes in S105), the process proceeds to the next pixel. Specifically, computation of a gradient vector (S102) is repeated on the next pixel.

When the edge vector points to the current block to be predicted (Yes in S104), the norm determination unit 203 computes a norm of the gradient vector (S106). Then, the norm determination unit 203 determines whether or not the computed norm of the gradient vector is larger than a predetermined threshold (S107). When the computed norm is not more than the predetermined threshold (No in S107) and there is a next pixel (Yes in S105), the process proceeds to the next pixel. Specifically, computation of a gradient vector (S102) is repeated on the next pixel.

When the norm of the gradient vector is larger than the norm of the predetermined threshold (Yes in S107), the norm determination unit 203 determines whether or not the computed norm is larger than a norm of the gradient vector having the largest norm of all previously determined gradient vectors (S10$). When the norm is larger than the largest norm (Yes in S108), the vector is marked as the new maximum vector (S109).

The norm determination unit 203 stores the vector and the position of the pixel in a memory, independent of a result of the comparison between the computed norm and the largest norm (S110). Here, the vector stored in the memory is preferably an edge vector. Furthermore, the memory is included in the norm determination unit 203, for example.

When there is a next pixel (Yes in S105), the process proceeds to the next pixel. Specifically, computation of a gradient vector (S102) is repeated on the next pixel.

As described above, the edge detection is performed on all of the pixels that are included in the surrounding blocks 30 surrounding the current block (current block 10) and that are subject to the edge detection (pixels left-diagonally hatched in FIG. 4), and the position of the pixels from which edges are detected and each of the edge vectors are stored in the memory.

According to the embodiment of the present invention, an intra-prediction mode set that may be employed for coding a block of image data depends on the result of the edge detection performed on adjacent, previously coded and decoded blocks. In other words, an edge is detected not from the current block but from surrounding blocks, and the intra-prediction mode set for coding the current block is determined based on a result of the detection.

The same holds true for the image decoding apparatus 300 when performing the edge detection. More specifically, the processes performed by the edge detection unit 201, the direction determination unit 202, and the norm determination unit 203 are respectively performed by the edge detection unit 401, the direction determination unit 402, and the norm determination unit 403.

Figure 8:
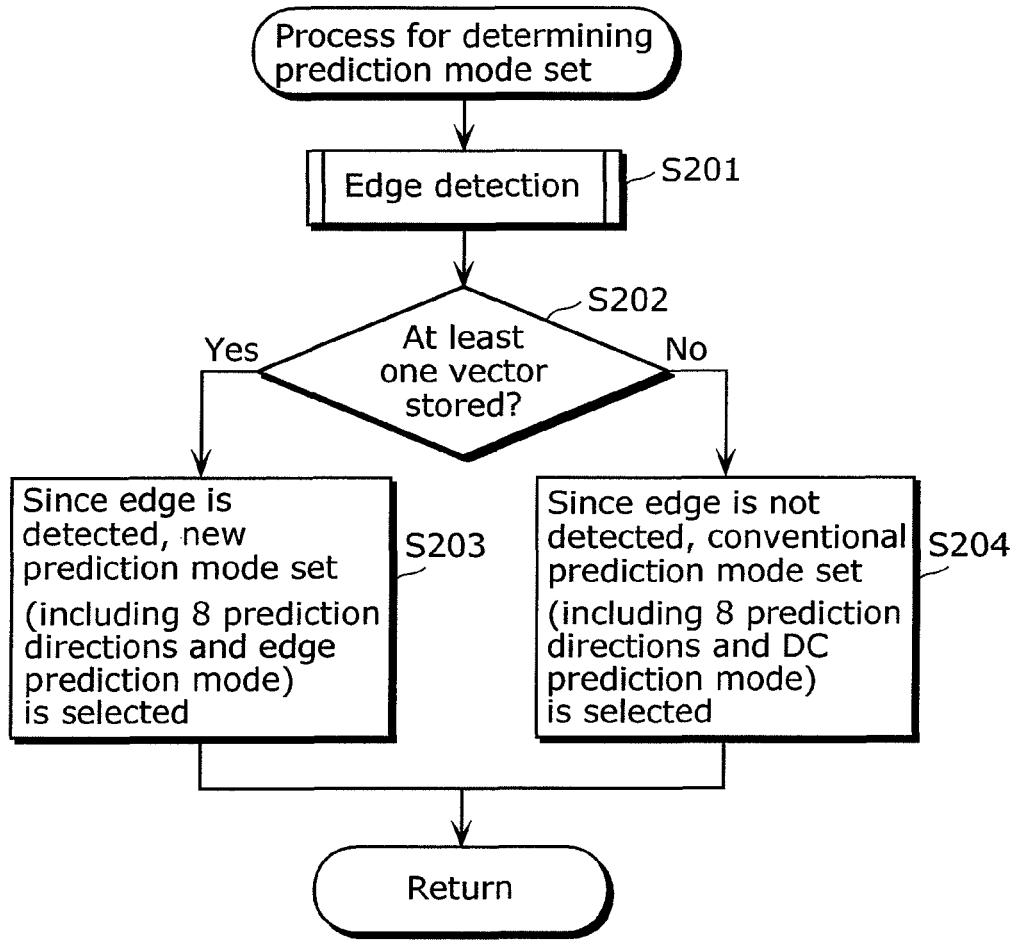
FIG. 8 is a flowchart illustrating a process for determining a prediction mode set according to the embodiment.

Next, a process for determining an intra-prediction mode set will be described with reference to FIG. 8. FIG. 8 is a flowchart illustrating the process for determining a suitable intra-prediction mode set.

First, the edge detection in FIG. 7 is performed by the edge detection unit 201, the direction determination unit 202, and the norm determination unit 203 (S201). Next, the prediction mode set determination unit 204 determines whether or not at least one vector is stored, i.e., whether or not there is a vector with a norm larger than a threshold along a direction of an edge that points to the current block.

When at least one vector is stored, i.e., an edge is detected (Yes in S202), the prediction mode set determination unit 204 selects the new prediction mode set as an available intra-prediction mode set (S203). The new edge prediction mode set includes the 8 conventional prediction directions (the directional prediction modes of the H.264 coding standard) and the new edge prediction mode.

When no edge vector is stored, i.e., an edge is not detected (No in S202), the prediction mode set determination unit 204 selects the conventional prediction mode set as the available intra-prediction mode set (S204). As described above, the conventional prediction mode set includes the 9 conventional prediction modes of the H.264 coding standard, i.e., the 8 conventional prediction directions and the conventional DC prediction mode.

As described above, the image coding apparatus 100 of the embodiment determines an intra-prediction mode set depending on whether or not an edge is detected. More specifically, the image coding apparatus 100 selects the intra-prediction mode set including the edge prediction mode when an edge is detected, while selecting the intra-prediction mode set including the DC prediction mode when an edge is not detected.

In the subsequent processes, the prediction mode selection unit 205 selects an intra-prediction mode out of the available prediction mode set for performing intra prediction using the intra-prediction unit 112.

Figure 9:
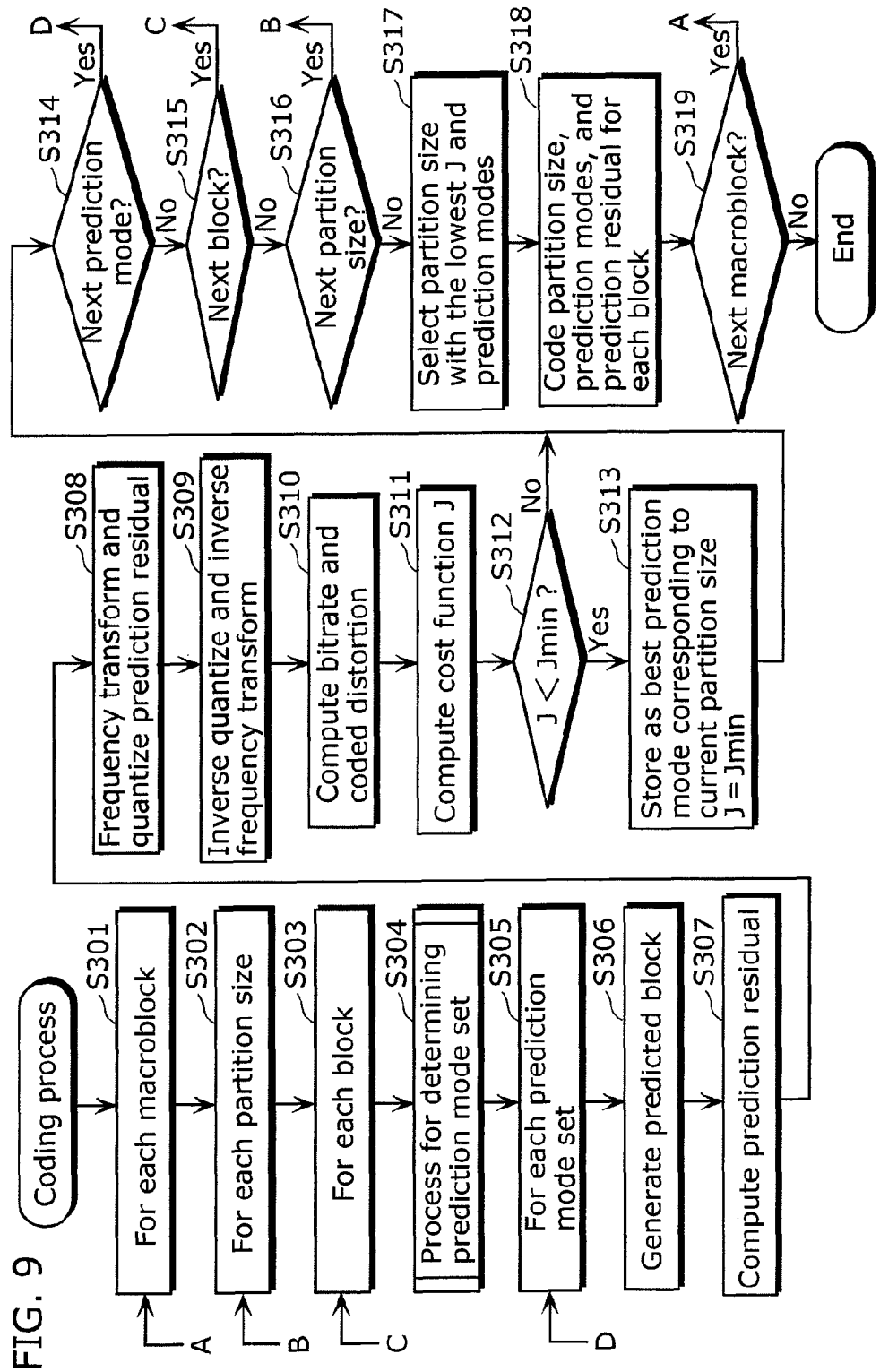
FIG. 9 is a flowchart illustrating a process for coding image data or video data based on intra prediction according to the embodiment.

Next, a coding process based on intra prediction by the image coding apparatus 100 according to the embodiment will be described with reference to FIG. 9. FIG. 9 is a flowchart illustrating a process for coding image data or video data based on intra prediction according to the embodiment.

The coding process in FIG. 9 is performed on each macroblock of 16×16 pixels (S301). Furthermore, the coding process is performed on each possible partition size obtained by partitioning a macroblock into blocks (4×4, 8×8, 16×16 pixels) (S302). Furthermore, the coding process is performed on each block obtained by partitioning the partition size (4×4 pixels) (S303).

The intra-prediction mode determination unit 110 executes the processes described with reference to FIG. 8, and selects a suitable intra-prediction mode set (S304). The optimum prediction mode is then selected by performing the processes (Steps 305 to 314) for each prediction mode included in the intra-prediction mode set.

More specifically, the prediction mode selection unit 205 selects one of the 9 prediction modes included in the intra-prediction mode set, as a current prediction mode for a current block B (S305). The selected current prediction mode is outputted to the intra-prediction unit 112.

The intra-prediction unit 112 generates a predicted block $B_{pred}$ corresponding to the current block B according to the current prediction mode (S306). The generated predicted block $B_{pred}$ is outputted to the subtracting unit 102.

The subtracting unit 102 computes a difference between the current block B and the predicted block $B_{pred}$, i.e., a prediction residual (prediction error) $B_{res}=B-B_{pred}$ (S307). The computed prediction residual $B_{res}$ is outputted to the frequency transform unit 103.

The frequency transform unit 103 performs frequency transformation on the computed prediction residual $B_{res}$, and outputs the frequency-transformed prediction residual (frequency transform coefficients) to the quantization unit 104.

The quantization unit 104 quantizes the frequency-transformed prediction residual (S308). The quantized frequency transform coefficients QT generated through the quantization are outputted to the inverse quantization unit 106 and the variable length coding unit 105.

The inverse quantization unit 106 inverse-quantizes the quantized frequency transform coefficients QT, and outputs the inverse-quantized frequency transform coefficients to the inverse frequency transform unit 107. The inverse frequency transform unit 107 generates a decoded difference block $B_{resq}$ by inverse-frequency transforming the inverse-quantized frequency transform coefficients (S309). The generated difference block $B_{resq}$, is outputted to the adding unit 108. The adding unit 108 adds the difference block $B_{resq}$ to the predicted block $B_{pred}$ to generate the decoded block $B_{pred}+B_{resq}$.

The coding mode determination unit 118 computes (i) a coded distortion $D=B-(B_{pred}+B_{resq})$ which is a difference between the current block B that is the original block and a reconstructed block $B_{pred}+B_{resq}$, and (ii) a bitrate $R=R_{res}+R_{mode}$ which is a sum of the bitrate required for coding the prediction residual $B_{res}$ and the current prediction mode (S310). Furthermore, the coding mode determination unit 118 computes a cost function $J=D+\lambda R$, using the computed coded distortion D and the bitrate R (S311).

The coding mode determination unit 118 determines whether or not the current value of the cost function J is smaller than a minimum value Jmin that has been previously stored (S312). When the computed cost function J is smaller than the minimum value Jmin (Yes in S312), the coding mode determination unit 118 stores the current prediction mode and the current partition size in a memory, and updates the previously stored minimum value Jmin to the computed current value of the cost function J (S313).

Next, when there is a next prediction mode, i.e., there is a prediction mode in which the cost function J has not yet been computed, among the prediction modes included in the determined prediction mode set (Yes in S314), the prediction mode selection unit 205 selects the prediction mode in which the cost function J has not yet been computed. Then, the processing is repeated from the process for generating a predicted block (S306), using the selected prediction mode as the current prediction mode.

When the cost function J is computed for all prediction modes (No in S314) and there is a next block (Yes in S315), the processing is repeated from the process for determining a prediction mode set (S304), using the next block as the current block. The presence of the next block indicates that there is a block in which the cost function J has not yet been computed, among all blocks included in one macroblock.

When there is no next block (No in S315) but there is a next partition size (Yes in S316), a macroblock is partitioned by the next partition size, and the following processing is repeated for each block according to the partition. The presence of the next partition size indicates that there is a partition size in which processing for each block has not yet been performed, among partition sizes obtainable by partitioning one macroblock. For example, since one macroblock can be partitioned into 3 partition sizes (4×4, 8×8, 16×16 pixels), the processes are repeated on each block partitioned into 3 partition sizes (S302 to S316).

Once all partitions have been processed (No in S316), the coding mode determination unit 118 selects a partition size with the lowest value of the cost function and the corresponding prediction modes (S317). Information indicating the selected partition size and the prediction modes is outputted to the variable length coding unit 105.

Finally, the variable length coding unit 105 codes the selected partition size, prediction modes, and the corresponding residuals, and writes a result of the coding to an output bitstream (S318). Here, the variable length coding unit 105 performs the coding, for instance, by means of a statistical coder.

Here, information indicating prediction modes in coding (mode indicator) is: (i) information indicating directional prediction modes when the directional prediction modes are selected, and (ii) information indicating that, when one of the DC prediction mode and the edge prediction mode is selected, the selected prediction mode is one of the DC prediction mode and the edge prediction mode. More specifically, the variable length coding unit 105 allocates one code word to both the DC prediction mode and the edge prediction mode.

Then, when there is a next macroblock (Yes in S319), the processes (S301 to S319) are then repeated on the next macroblock.

As described above, the image coding apparatus 100 of the embodiment determines a prediction mode for each block, and codes the input video data. Furthermore, a prediction mode set is determined before a prediction mode is selected. In the embodiment, candidate prediction mode sets include the conventional prediction mode set and the new prediction mode set. The new prediction mode set includes the edge prediction mode instead of the DC prediction mode.

Here, the information indicating the edge prediction mode that is a new prediction mode is coded using the code word identical to the code word to be used for the information indicating the DC prediction mode. Thus, a decoder that receives the code word determines whether the information indicates the DC prediction mode or the edge prediction mode. Since there is no need to allocate a new code word to information indicating the edge prediction mode, increase in the amount of coded data can be prevented.

Hereinafter, the new edge prediction mode will be explained in further detail.

As explained above, the gradients of the surrounding pixels are computed for each pixel subject to the computation. The intra-prediction unit 112 computes an angle of an edge, using a vector having the maximum norm and vectors in pixels adjacent to a pixel corresponding to the vector having the maximum norm. More specifically, in each of the adjacent pixels, a norm of a corresponding edge vector (or gradient vector) is compared with a norm of the maximum vector. The edge vectors of the adjacent pixels are stored in a memory only when the norm of the edge vectors is larger than half the norm of the maximum vector, so that the edge vectors of the adjacent pixels can be used. Then, the intra-prediction unit 112 computes an average of angles between the maximum vector and each of the surrounding vectors that are stored in a memory, as an angle α of a direction of the new edge prediction mode. More specifically, the process is performed according to a flowchart in FIG. 10.

Figure 10:
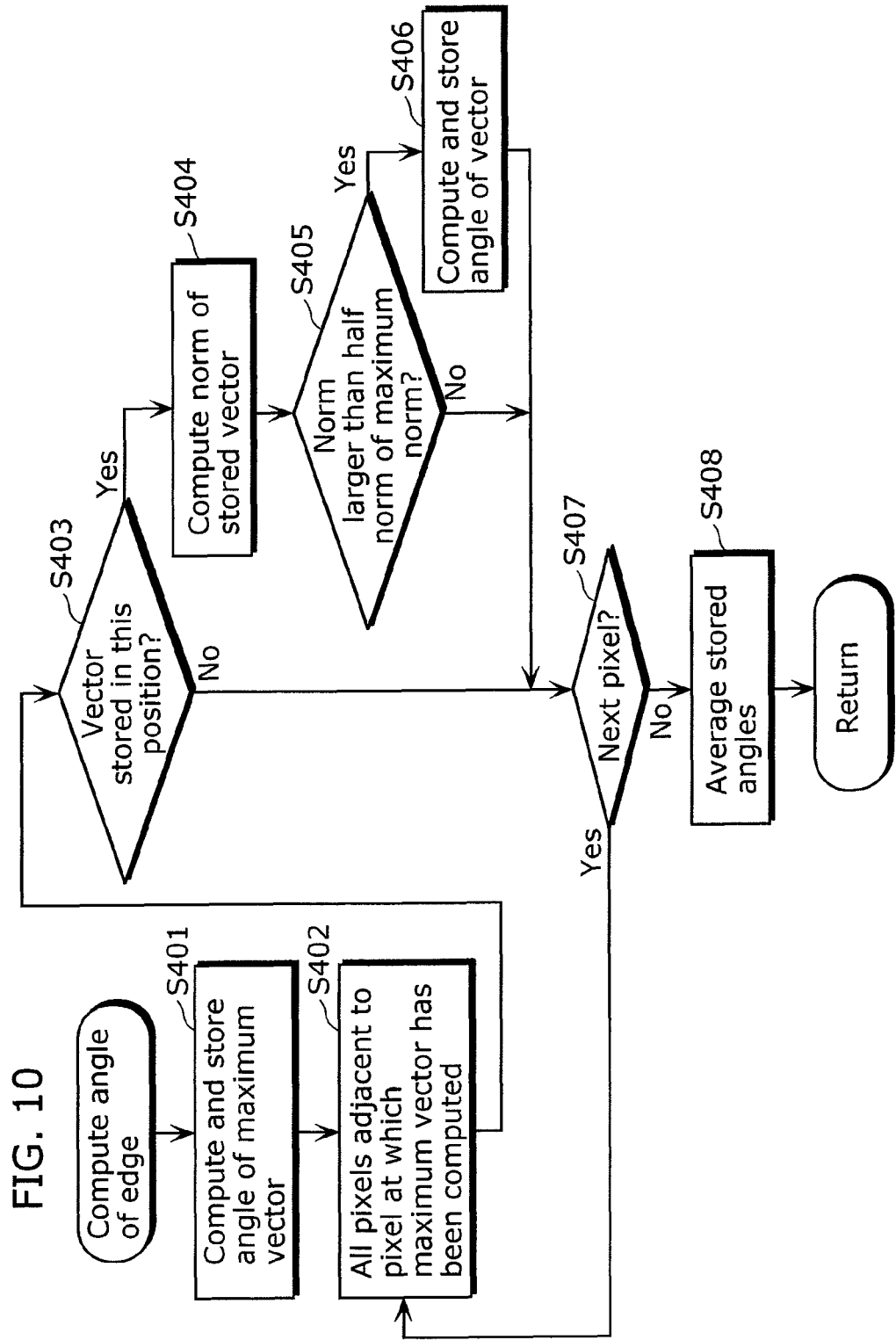
FIG. 10 is a flowchart illustrating a process for computing an angle of an edge according to the embodiment.

FIG. 10 is a flowchart illustrating a process for computing an angle of an edge according to the embodiment. The process depends on a result of the edge detection described with reference to FIG. 7. As the result of the edge detection in FIG. 7, positions of pixels corresponding to 1 or more edge vectors that are determined to be larger than a threshold are stored in a memory.

The norm determination unit 203 computes an angle of the maximum edge vector detected in the edge detection, and stores the angle in the memory (S401). Then, the following processes are performed on all pixels that are adjacent to a pixel at which the maximum edge vector has been computed (S402). In other words, the norm determination unit 203 performs the following processes using a position of one of the pixels adjacent to the pixel at which the maximum edge vector has been computed, as the current pixel position.

Next, the norm determination unit 203 determines whether an edge vector corresponding to the current pixel position is stored in the memory included in the norm determination unit 203 (S403). In other words, the norm determination unit 203 determines whether an edge vector has a norm larger than a threshold and the edge vector pointing to the current block is stored in the memory.

When the edge vector is stored (Yes in S403), the norm determination unit 203 computes a norm of the stored edge vector (S404). Then, the norm determination unit 203 compares the computed norm with a norm of the maximum edge vector (S405). when the computed norm is larger than half the norm of the maximum vector (Yes in S405), the norm determination unit 203 computes an angle of the vector in the current pixel position, and stores the angle in the memory (S406).

The aforementioned processes (S403 to S406) are performed on all of the current pixels. When there is no next pixel, i.e., the processes are performed on all of the current pixels (No in S407), the norm determination unit 203 computes the angle of the edge by averaging the angles stored in the memory (S408).

The above processes for detecting an edge and determining its angle as shown in FIG. 10 are merely exemplary. The present invention is not limited to any particular method for detecting edges or determining their directions. In particular, the angle may also be determined from a direction of the maximum edge vector only or from a greater or smaller number of neighboring vectors or other vectors along the edge. Furthermore, although a vector stored in the memory is defined as an edge vector in the description, it may be a gradient vector.

When the prediction mode selection unit 205 selects the edge prediction mode, the intra-prediction unit 112 generates a predicted block using the angle of the edge determined as indicated above, i.e., a direction of the edge as a prediction direction. Here, the intra-prediction unit 112 may compute the angle of the edge. In such a case, the intra-prediction unit 112 includes processing units corresponding to the edge detection unit 201, the direction determination unit 202, and the norm determination unit 203.

The same holds true for the image decoding apparatus 300 when computing the angle of the edge. More specifically, the processing performed by the edge detection unit 201, the direction determination unit 202, and the norm determination unit 203 are respectively performed by the edge detection unit 401, the direction determination unit 402, and the norm determination unit 403.

Next, a process for generating a predicted block according to the edge prediction mode of the embodiment, with reference to FIG. 11A to FIG. 13.

Figure 11A:
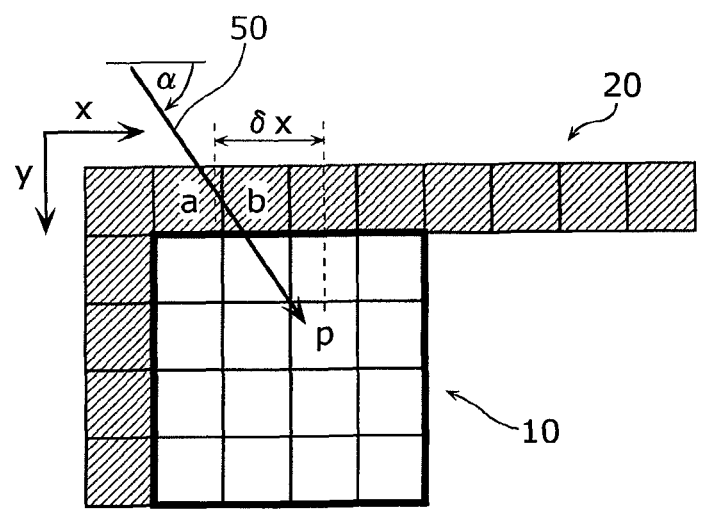
FIG. 11A schematically illustrates a process for generating a predicted block according to the edge prediction mode by extrapolating image data that has been previously coded and decoded according to the embodiment.
Figure 11B:
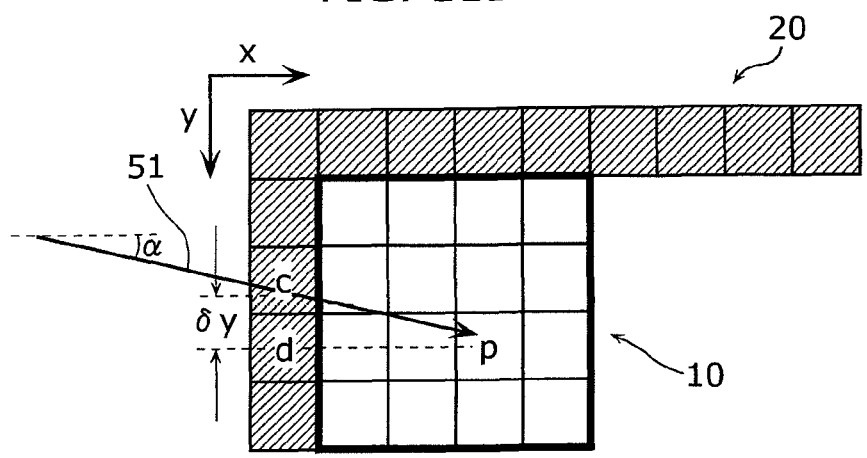
FIG. 11B schematically illustrates a process for generating a predicted block according to the edge prediction mode by extrapolating image data that has been previously coded and decoded according to the embodiment.
Figure 12:
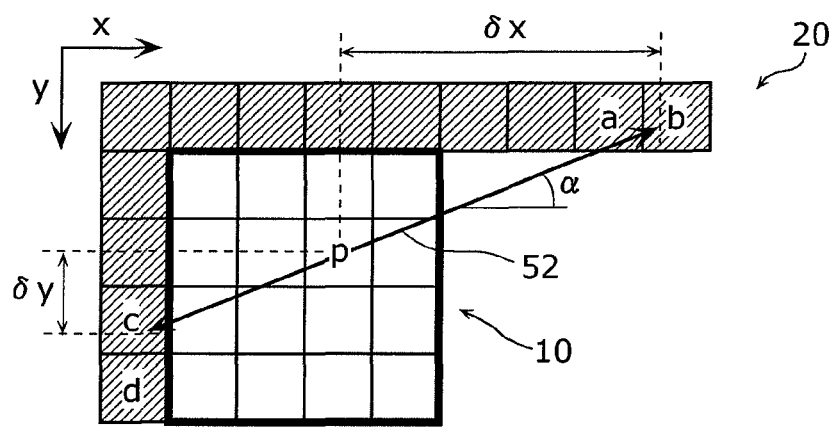
FIG. 12 schematically illustrates edge prediction by interpolating image data that has been previously coded and decoded according to the embodiment.

FIGS. 11A, 11B, and 12 are schematic drawings illustrating the edge prediction mode of the embodiment. According to this mode, the current block is predicted by extrapolating or interpolating previously coded and decoded video data along a certain direction. A direction of intra prediction is fixed in the conventional intra-prediction modes (FIG. 1B), whereas the current block can be predicted along any direction in the edge prediction mode. According to the embodiment, a direction for prediction is determined by detecting an edge in image data that has been previously coded and decoded.

FIG. 11A illustrates a case where an edge direction 50 that has been detected crosses an upper border of the current block 10. As illustrated in FIG. 11A, the current block 10 is predicted by extrapolating the previously coded and decoded video data, more specifically, by aligning the reference pixels 20 along the detected edge direction 50 of the detected edge. In other words, the intra-prediction unit 112 generates a predicted block using pixel values of the reference pixels 20 that have been determined according to the direction of the edge (or interpolated values computed from one or more of the reference pixels 20) as pixel values (predicted values) of pixels included in the predicted block.

The intra-prediction unit 112 employs an linear interpolation among the reference pixels 20 for computing predicted values of the pixels in order to preserve the sharpness of the edge. As illustrated in FIG. 11A, a position determined by a parallel translation of the reference pixels according to the determined angle α does not match an integer pixel position.

For each pixel to be predicted at a position (x, y), a reference position $(x-\delta_x)$ is determined depending on the angle α of the edge which is indicated by the edge direction 50. A reference value at the reference position is then computed by linearly interpolating 2 surrounding integer reference pixels "a" and "b". The computed reference value is then used as a predicted value "p" of a pixel to be predicted. The available reference pixels are the reference pixels 20 directly adjacent to the current block 10.

The predicted value "p" is computed as a weighted sum of pixel values of the 2 reference pixels "a" and "b", using Equation 3 below, $$p=w_a a+w_b b \qquad \text{[Equation 3]}$$

Here, $w_a=\delta_x-\text{floor}(\delta_x)$, $w_b=\text{ceil}(\delta_x)$, and $\delta_x=y \cot \alpha$.

The horizontal increment 6, is computed from the angle α of the detected edge and the position (x, y) of the pixel that is to be predicted within the block. A position (0, 0) is at the upper-left corner of the reference pixels 20 adjacent to the current block 10 in FIG. 11A. Thus, the predicted value "p" is indicated at a point (3, 2) in FIG. 11A.

An equation similar to Equation 3 is employed when a line through pixels and parallel to the detected edge (an edge direction 51) crosses a left border, not the upper border of the current block 10. FIG. 11B illustrates a case where the edge direction 51 of the detected edge crosses the left border of the current block 10. Here, a vertical increment is indicated by $\delta_y$, and the predicted value "p" for the position (x, y) of the pixel is computed using reference pixel values "c" and "d" according to Equation 4, $$p=w_c c+w_d d \qquad \text{[Equation 4]}$$

Here, $w_c=\delta_y-\text{floor}(\delta_y)$, $w_d=\text{ceil}(\delta_y)-\delta_y$, and $\delta_y=x \tan \alpha$.

A position (0, 0) is at the upper-left corner of the reference pixels 20 adjacent to the current block 10 in FIG. 11B. Thus, the predicted value "p" is indicated at a point (4, 4) in FIG. 11B.

As indicated in FIG. 12, there may be 2 relevant reference positions ("a" and "b", and "c" and "d"), if a line through pixels and parallel to the detected edge (an edge direction 52) crosses the left border of the current block as well as its upper border or the upper border of a block positioned to the right of the current block. In this case, the current block 10 may be predicted by interpolating previously coded and decoded video data rather than by an extrapolation, so that both reference positions are used for prediction. The predicted value is the result of a linear interpolation of the interpolated pixel values at the 2 reference positions.

Specifically, the predicted value "p" may be computed as a weighted sum of the 4 reference pixel values "a", "b", "c", and "d", for instance, as indicated in Equation 5.

$$p = \frac{w_{up}}{w_{up}+w_{left}}(w_a a + w_b b) + \frac{w_{left}}{w_{up}+w_{left}}(w_c c + w_d d) \qquad \text{[Equation 5]}$$

Here, $w_{up}$=N−y, $w_{left}$=N−x, and N=4 or N=8, where N depends on a block size.

Another possibility would be to compute the real interpolation between the 2 reference positions, i.e., $w_{up}$ and $w_{left}$ being a Euclidean distance between the 2 reference positions.

As described above, the intra-prediction unit 112 predicts the current block by extrapolating or interpolating previously generated (coded and decoded) decoded image data (i.e., reference pixels (also referred to as decoded pixels) along a direction of an detected edge. The decoded image data corresponds to pixels included in a block adjacent to the current block. The extrapolation or interpolation means a linear extrapolation or interpolation.

More specifically, the intra-prediction unit 112 computes a weighted sum of at least 2 reference pixel values for each predicted pixel included in a predicted block (refer to Equations 3, 4, and 5), and generates the predicted block by extrapolating or interpolating the is computed weighted sum. The weights ($w_a$, $w_b$, $w_c$, and $w_d$) are determined according to the direction of the edge. For example, a larger value is assigned to each of the weights, as a distance from one of the reference pixels respectively corresponding to the weights to a line that crosses the predicted pixels and is directed to an edge (such as the edge direction 50) is smaller.

Figure 13:
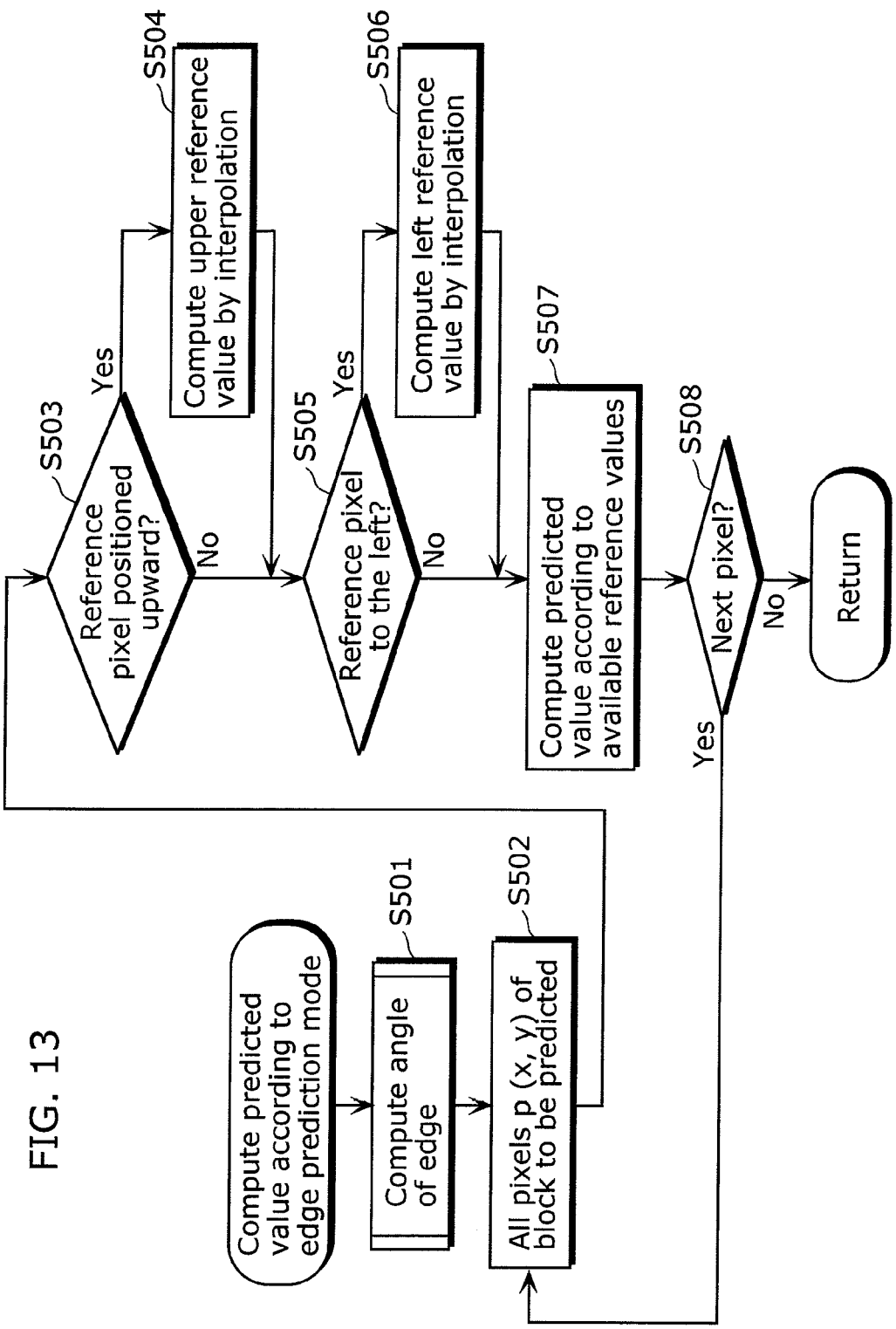
FIG. 13 is a flowchart illustrating a method for generating a predicted block according to the edge prediction mode in the embodiment.

FIG. 13 is a flowchart illustrating a method for computing a predicted value (i.e., generating a predicted block) according to the edge prediction mode in the embodiment.

First, the intra-prediction unit 112 determines an angle of an edge in accordance with the processes described with reference to FIG. 10 (S501), for instance. The following steps are performed on all pixels of the current block to be predicted (S502).

The intra-prediction unit 112 determines whether or not there is a reference pixel positioned upward of the current pixel along a direction defined by the computed angle, for example, as illustrated in FIG. 11A (S503). When there is such a reference pixel upward (Yes in S503), the intra-prediction unit 112 computes an upper reference value $r_{up}$ using Equation 3 (S504). Here, the intra-prediction unit 112 computes the upper reference value $r_{up}$ by replacing "p" with $r_{up}$ in Equation 3.

Next, the intra-prediction unit 112 determines whether or not there is a reference pixel to the left of the current pixel, along the direction defined by the computed angle, for example, as illustrated in FIG. 11B (S505). When there is such a reference pixel to the left (Yes in S505), the intra-prediction unit 112 computes a left reference value $r_{left}$ using Equation 4 (S506). Here, the intra-prediction unit 112 computes the left reference value $r_{left}$ by replacing "p" with $r_{left}$.

Then, the intra-prediction unit 112 computes the predicted value "p" of the current pixel according to the availability of upper and left reference values (S507). When both reference values are available, the predicted value "p" is computed by p=($w_{up}r_{up}$+$w_{left}r_{left}$)/($w_{up}$+$w_{left}$). When only one of the upper reference value and the left reference value is available, the predicted value "p" is set to p=$r_{up}$ and p=$r_{left}$, respectively. When neither of them is available, the predicted value "p" is computed by averaging pixel values of adjacent pixels that have been previously predicted, in other words, using Equation 6.

$$p(x,y) = \tfrac{1}{3}[p(x-1,y-1)+p(x-1,y)+p(x,y-1)] \qquad \text{[Equation 6]}$$

Here, p (x, y) denotes a predicted value at a position (x, y) in Equation 6.

When there is a next pixel (Yes in S508), the processes (S503 to S507) are repeated. More specifically, the processes are executed until predicted values for all pixels included in the current block are computed.

As described above, the image coding apparatus 100 of the embodiment can generate a predicted block by computing predicted values along a direction of an detected edge, when the edge prediction mode is selected.

The same holds true for the image decoding apparatus 300 when computing predicted values. More specifically, the processing performed by the intra-prediction unit 112 is executed by the intra-prediction unit 305.

Furthermore, although a predicted block is generated along a direction, the predicted block may be generated along 2 or more directions, according to the embodiment.

Figure 14:
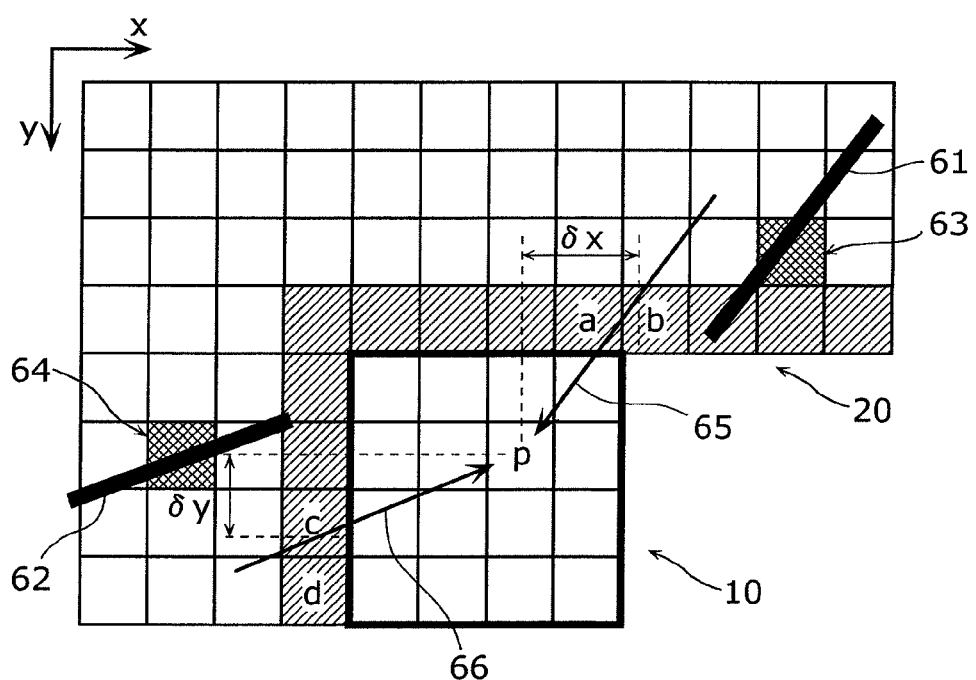
FIG. 14 schematically illustrates a process for generating a predicted block according to the edge prediction mode using at least 2 edges in the embodiment.

FIG. 14 schematically illustrates that predicted pixels are predicted along 2 or more directions according to the embodiment. For example, when two strong edges 61 and 62 having directions different from each other but both pointing to the current block are detected in two non-adjacent pixels 63 and 64, pixel values may be predicted by extrapolating or interpolating the previously decoded reference pixels 20 along one of two directions of edges, or more preferably, along a direction obtained by combining edge directions 65 and 66. For example, the edge directions 65 and 66 may be combined by computing a weighted sum as in Equation 5. The horizontal increment $\delta_x$ and the vertical increment $\delta_y$, however, will be computed from the edge directions 65 and 66 (angles) of the first edge and the second edge, respectively.

The present invention is limited neither with respect to the number of edges and directions that are employed for prediction nor with respect to the way in which the individual results are combined.

In order to preserve the sharpness of each of these edges, the weights for use in computing a weighted sum of reference pixel values may also be computed according to a distance from each predicted pixel to be predicted to an extension of each of the detected edges. For example, a larger value is assigned to each of the weights, as a distance from one of the reference pixels ("a", "b", "c", and "d" in FIG. 14) respectively corresponding to the weights to an extension of one of at least 2 detected edges is smaller.

In particular, the weights $w_{left}$ and $w_{up}$ may be set to 1 and 0, respectively, for all pixels that are crossed by an edge (or an extension of an edge) detected in a block to the left of the current block. Furthermore, the weights $w_{left}$ and $w_{up}$ may be set to 1 and 0, respectively, for all pixels that are crossed by an edge (or an extension of an edge) detected in a block above the current block. Specifically, a larger value is assigned to each of the weights, as a distance from the reference pixels ("a", "b", "c", and "d" in FIG. 14) respectively corresponding to the weights to a decoded block from which at least one of the two edges is detected is smaller. The weights for the remaining pixels, i.e., the pixels that are not crossed by any of detected edges (or extensions of edges) may be set, depending on a distance from a predicted pixel, as described above.

Next, a decoding process using intra prediction according to the embodiment will be described with reference to FIG.

Figure 15:
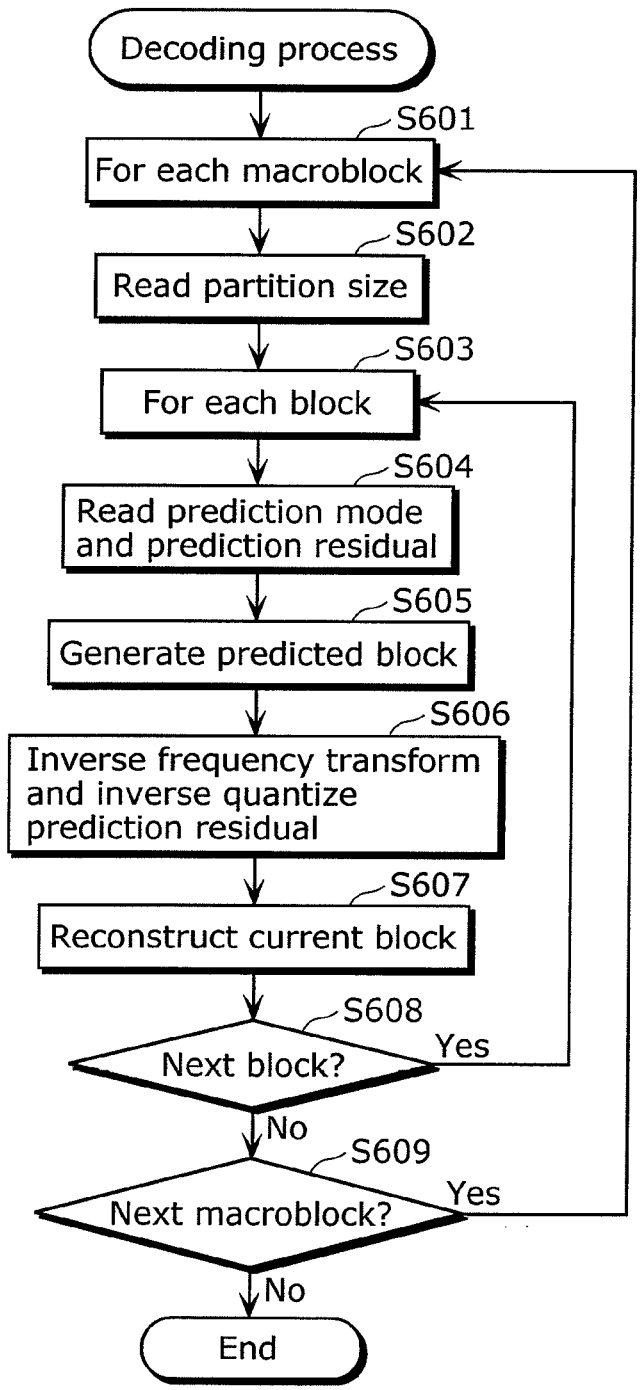
FIG. 15 is a flowchart illustrating a process for decoding image data and video data using intra prediction according to the embodiment.

15. FIG. 15 is a flowchart illustrating a process for decoding image data and video data using intra prediction according to the embodiment.

The decoding process in FIG. 15 is executed for each macroblock of 16×16 pixels (S601). First, a partition size is read from an input bitstream, i.e., is decoded by a statistical decoder (S602). Then, the decoding processes are executed for each block of the current macroblock according to the partition size (S603).

The prediction mode of the current block and its residual information indicating the coded prediction error are read from the input bitstream (S604). The read prediction mode is outputted to the intra-prediction unit 305 or the motion compensation unit 306, through the control unit 307 and the switch 308. The residual information is outputted to the inverse quantization unit 301.

Next, the intra-prediction unit 305 or the motion compensation unit 306 generates a predicted block corresponding to the current block, according to the read prediction mode (S605). The process, in particular, executed by the intra-prediction unit 305 in the process for generating the predicted block will be described in further detail with reference to FIG. 16.

The inverse quantization unit 301 inverse-quantizes the residual information, and outputs the inverse-quantized residual information to the inverse frequency transform unit 302. Then, the inverse frequency transform unit 302 performs inverse frequency transformation on the inverse-quantized residual information (S606). The decoded differential image generated through the inverse frequency transformation is outputted to the adding unit 303.

The adding unit 303 reconstructs the current block by adding the predicted block and the decoded differential image (S607). The decoded image generated by the adding unit 303 is stored in the frame memory 304, and is used by the intra-prediction unit 305 or the motion compensation unit 306 as a reference picture.

Then, when there is a next block (Yes in S608), the processes from reading the prediction mode and the prediction residual (S604) are then repeated on the next block. When there is no next block (No in S608) but there is a next macroblock (Yes in S609), the processes from reading the partition size (S602) are repeated on the next macroblock.

Figure 16:
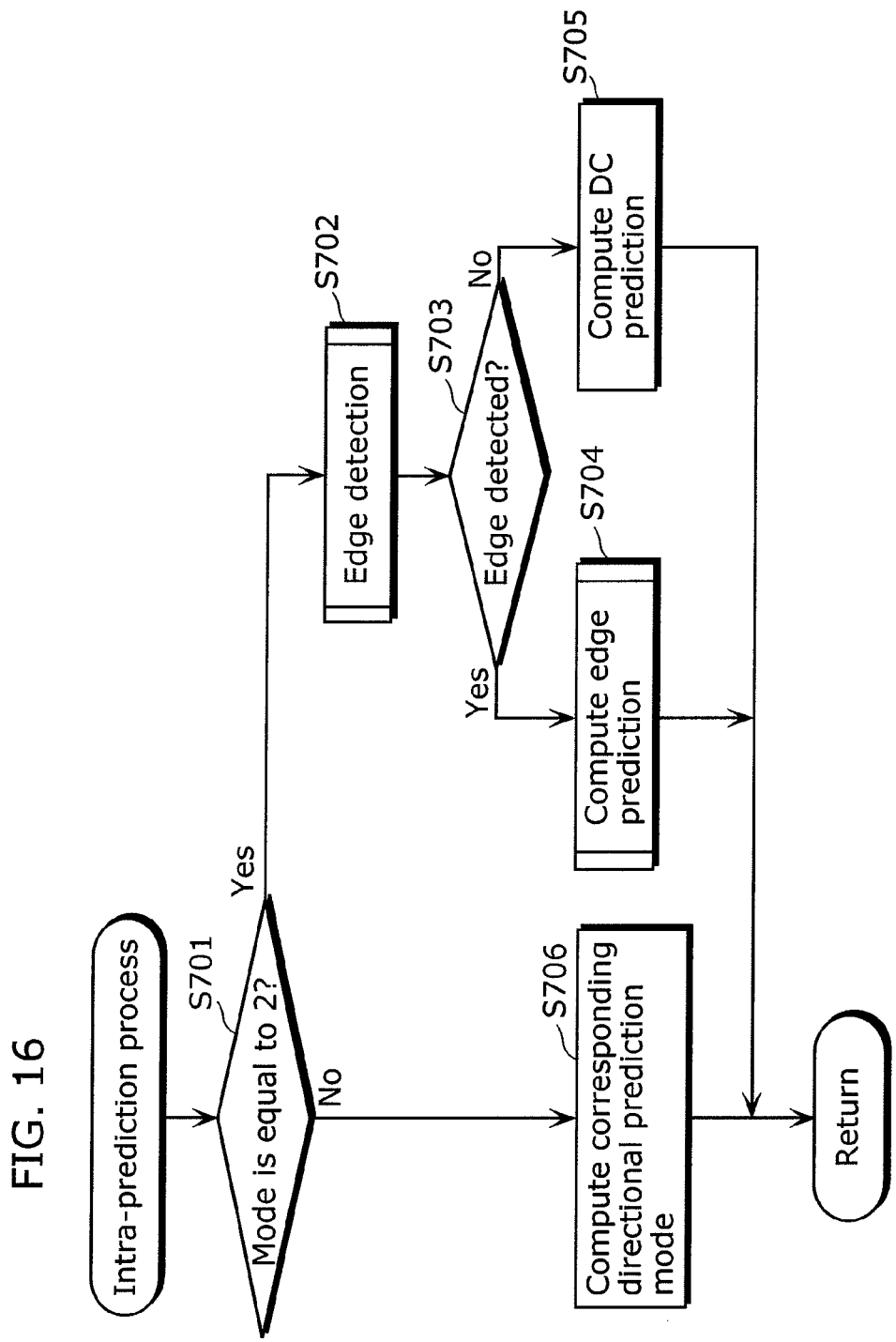
FIG. 16 is a flowchart illustrating a method for intra prediction according to the embodiment.

Next, an intra-prediction process for the image decoding tri apparatus 300 according to the embodiment will be described with reference to FIG. 16. FIG. 16 is a flowchart illustrating the intra-prediction process according to the embodiment. Here, the intra-prediction unit 305 performs the intra-prediction process in FIG. 16 when generating a predicted block (S605 in FIG. 15).

The prediction mode determination unit 404 determines whether or not the prediction mode is equal to 2, i.e., the prediction mode indicates the DC prediction mode or the edge prediction mode (S701). When the prediction mode is equal to 2 (Yes in S701), the edge detection unit 401, the direction determination unit 402, and the norm determination unit 403 perform edge detection (FIG. 7) (S702).

When the edge is detected (Yes in S703), the prediction mode determination unit 404 selects the edge prediction mode, and the predicted block generation unit 405 generates the predicted block according to the edge prediction mode (S704) The processes for generating the predicted block are as described with reference to FIG. 13.

When the edge is not detected (No in S703), the prediction mode determination unit 404 selects the DC prediction mode, and the predicted block generation unit 405 generates the predicted block according to the conventional DC prediction mode (S705).

When the prediction mode is different from 2 (No in S701), the prediction mode determination unit 404 selects one of the conventional directional prediction modes indicated by the prediction mode, and the predicted block generation unit 405 generates the predicted block according to the conventional directional prediction mode (S706).

As described above, the image decoding apparatus 300 of the embodiment determines a prediction mode of the current block, and performs edge detection when the intra-prediction mode is equal to 2, i.e., the prediction mode indicates one of the DC prediction mode and the edge prediction mode. Furthermore, the image decoding apparatus 300 determines that the prediction mode is the edge prediction mode when an edge is detected, and that the prediction tri mode is the DC prediction mode when an edge is not detected.

Thereby, a bitstream coded according to the edge prediction mode can be accurately decoded. Furthermore, since edge detection is not always performed but limited, the processing load of the image decoding apparatus 300 can be reduced, and spending much time on the decoding process can be prevented.

As described above, the image coding apparatus 100 and the image decoding apparatus 300 of the embodiment can employ the new edge prediction mode when the intra prediction is performed. Thereby, when a picture including a sharp linear edge and to be coded is coded, higher coding efficiency can be achieved.

Furthermore, the image coding apparatus 100 of the embodiment codes information indicating the new edge prediction mode as information indicating the DC prediction mode. In other words, the image coding apparatus 100 employs the very same code for signaling the conventional DC intra-prediction mode and the new intra-prediction mode. Thereby, the amount of coded data is not increased along with the use of the new intra-prediction mode.

Furthermore, the image coding apparatus 100 of the embodiment does not code information necessary for the edge prediction mode, such as a direction of an edge so as to detect a direction of an edge from blocks surrounding the current block. Furthermore, the image decoding apparatus 300 includes a processing unit that performs edge detection as in the image coding apparatus 100, so that there is no need for signaling information necessary for the edge prediction mode.

Thus, a codec apparatus including the image coding apparatus 100 and the image decoding apparatus 300 of the embodiment does not need any additional signaling overhead for using the new intra-prediction mode.

Figure 17A:
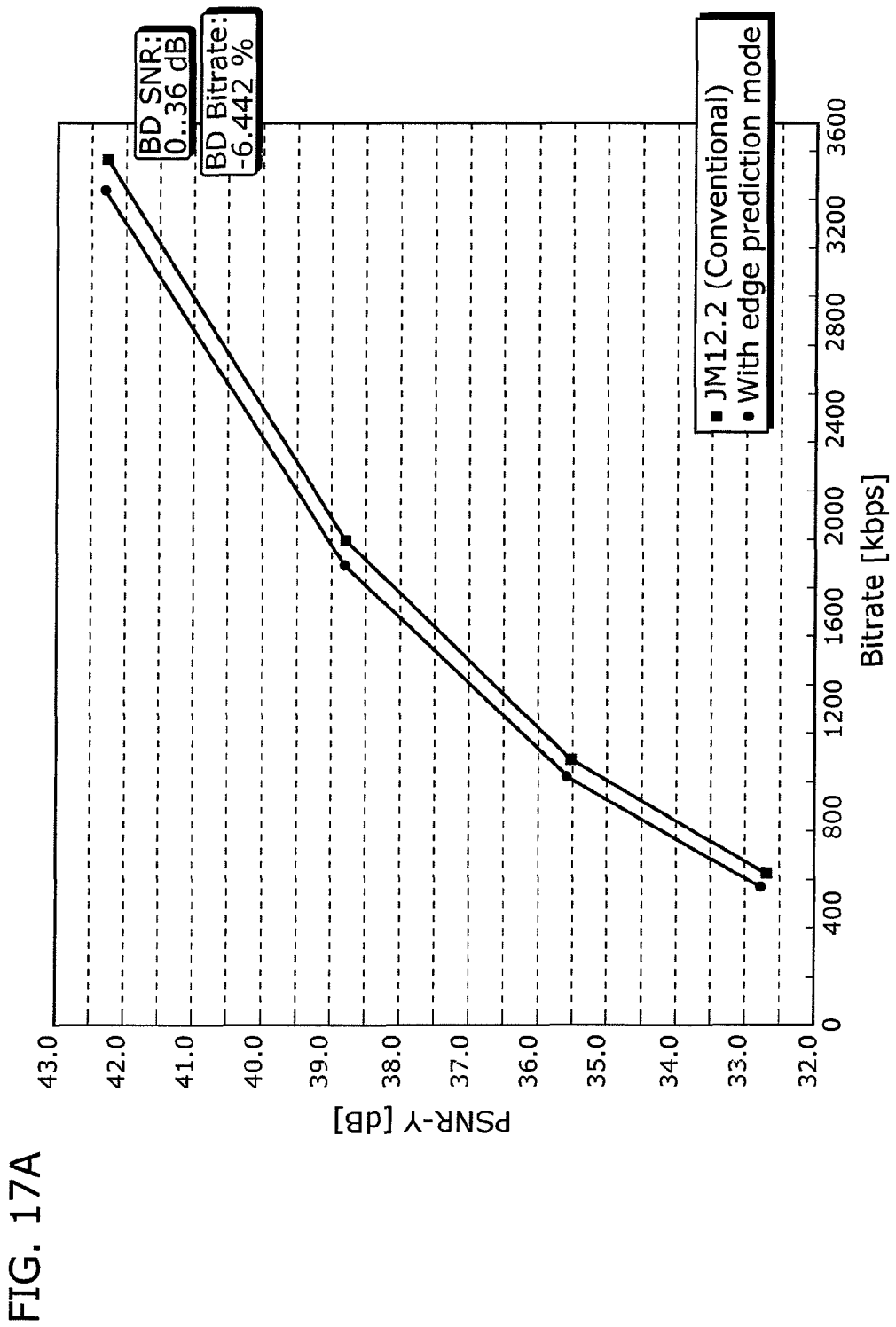
FIG. 17A shows a rate distortion curve for the first 10 frames of the sequence Foreman (CIF).
Figure 17B:
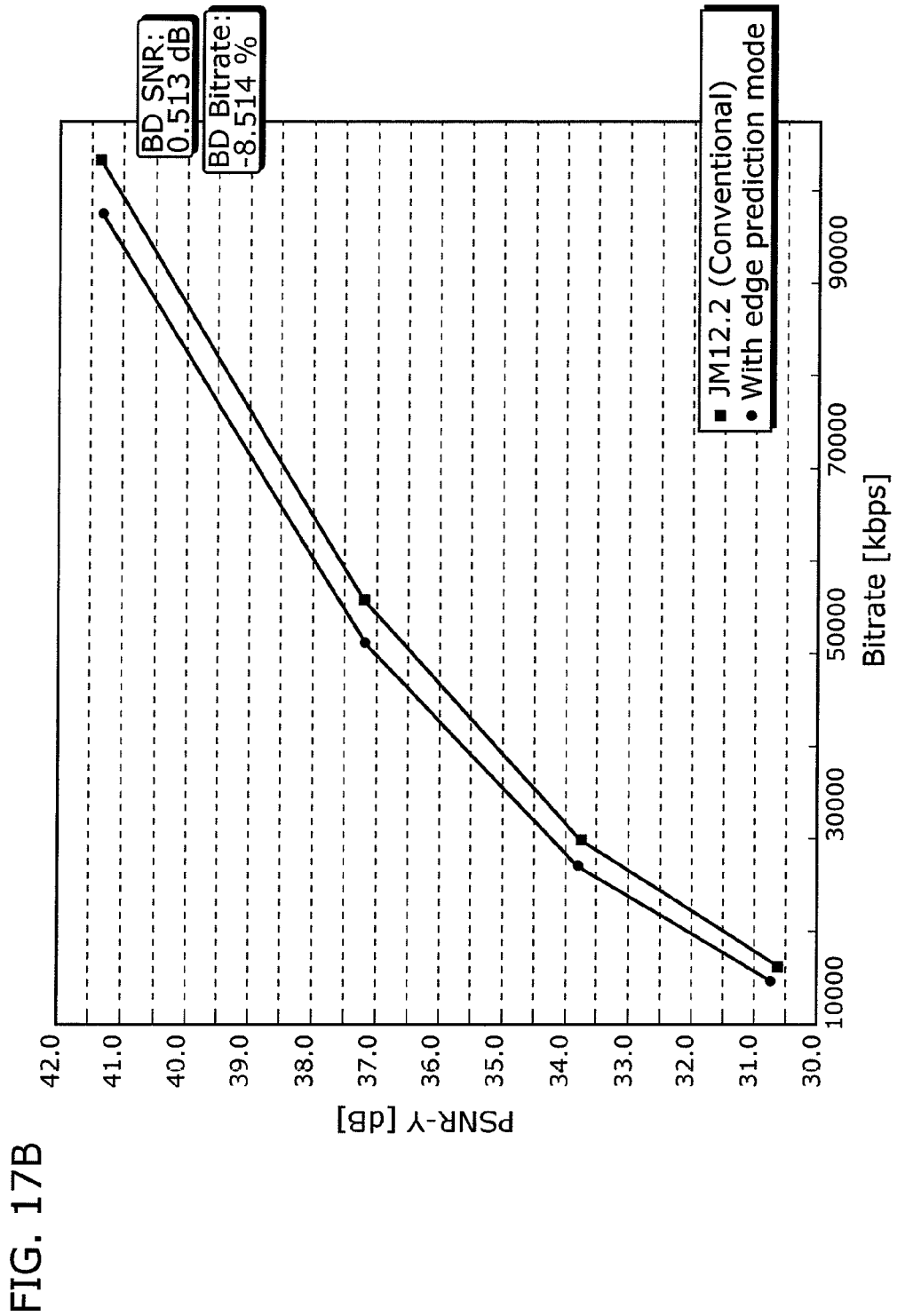
FIG. 17B shows a rate distortion curve for the sequence SpinCalendar (720 p).
Figure 18:
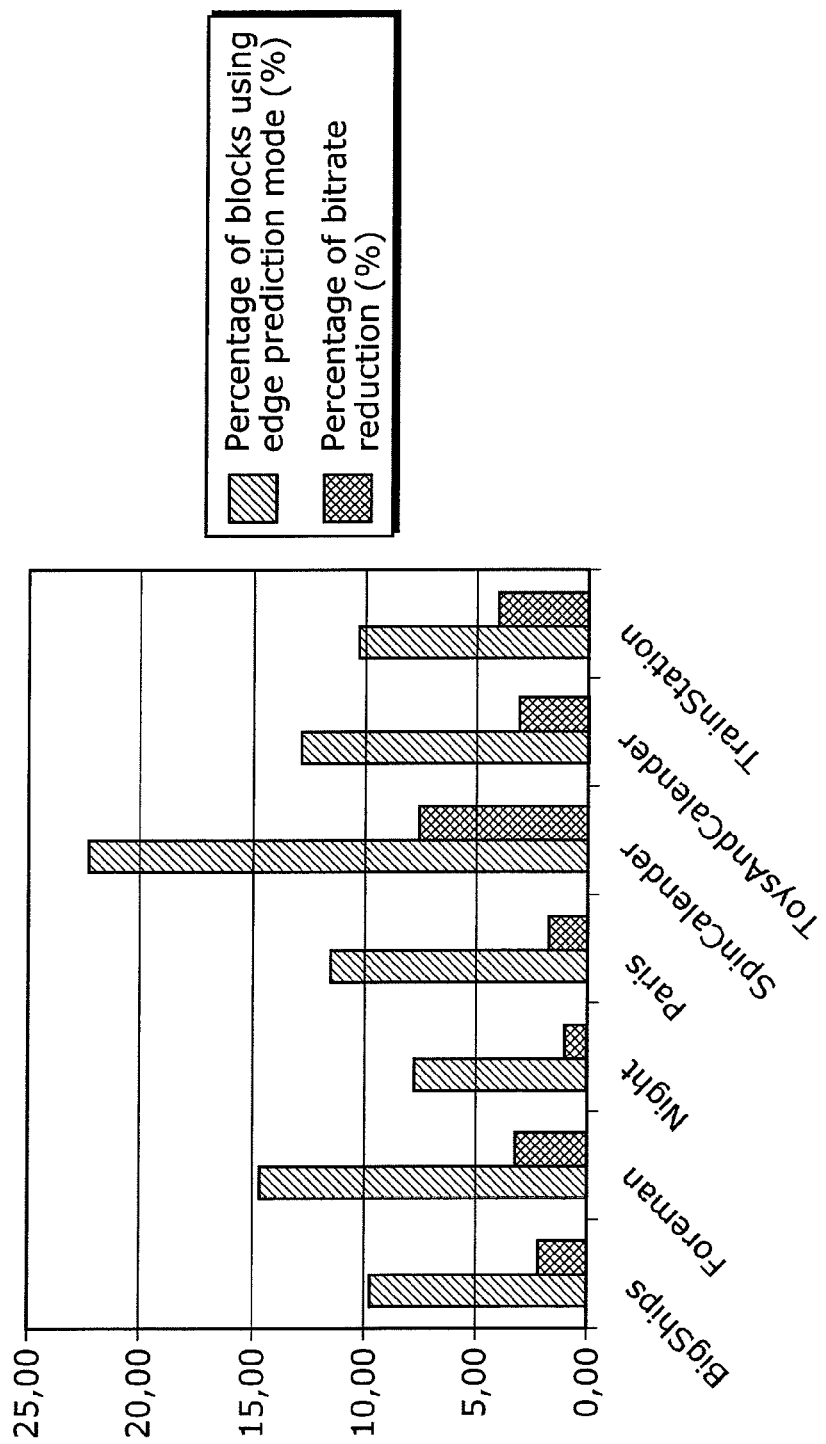
FIG. 18 is a chart indicating the percentage of blocks coded using the edge prediction mode and the bitrate reduction percentage.

FIGS. 17A, 17B, and 18 show diagrams for describing advantages of the image coding apparatus 100 of the embodiment. FIG. 17A shows a relationship between a Peak Signal-to-Noise Ratio (PSNR) and a bitrate when the first 10 frames of a sequence Foreman (Common Intermediate Format (resolution of 352×288) abbreviated as CIF) are coded. FIG. 17B shows a relationship between a PSNR and a bitrate when a sequence SpinCalendar is coded. Furthermore, FIG. 18 is a chart indicating the percentage of blocks obtained by coding different sequences using the edge prediction mode, and the bitrate reduction.

For example, when the sequence SpinCalendar was coded, the bitrate reduction was over 8%, showing a significant improvement in coding efficiency of sequences including lots of sharp edges. It turned out that the results for coding the sequence Foreman were better when coding the first 10 frames of the sequence rather than coding 300 frames (all sequences) (6.44% of bitrate reduction). The reason is that the sequence Foreman includes lots of sharp linear edges at the beginning of the sequence. In these frames, the edge prediction mode is often selected (for about 15% of the blocks on average) and the edges are better predicted. On the other hand, there are very few edges at the end of the sequence. In these frames, the edge prediction mode is almost never used (for only about 3% to 4% of the blocks on average). That is why the mean bitrate reduction for the whole sequence is 137%.

These results do also show that the performance of the edge prediction is highly dependent on content of an image. For images with very few edges or blurred edges, the edge prediction mode is almost never used. For such sequences, there is no advantage as compared to the conventional coding method, but there is no loss either, because the DC prediction mode is almost always used in the prediction mode set. Such images are coded with the 9 conventional prediction modes of H.264.

The following table contains the results on the high precision edge prediction technique in terms of bitrate reduction and PSNR improvement for the sequences simulated.

TABLE 1

|  | Average bitrate reduction | Average PSNR improvement |
| --- | --- | --- |
| Foreman (CIF, resolution of 352 × 288) | 3.37% | 0.20 dB |
| Paris (CIF) | 1.67% | 0.15 dB |
| ToysAndCalendar (VGA, resolution of 640 × 480) | 2.62% | 0.16 dB |
| TrainStation (VGA) | 4.62% | 0.23 dB |
| BigShips (720p, resolution of 1280 × 720) | 1.97% | 0.11 dB |
| SpinCalendar (720p) | 8.51% | 0.51 dB |

As shown in Table 1, the results can differ a lot between different sequences. There is no linear relationship between the frequency of using the edge prediction mode and the final gain, but the best gains are obtained for the images containing lots of edges easily predicted with the edge prediction mode.

Although an image coding apparatus and an image decoding apparatus according to an aspect of the present invention are described hereinbefore, the present invention is not limited to these in the embodiment. The modifications conceived by those skilled in the art are included within the scope of the present invention, as long as they are not departing from the purport of the present invention.

According to the above embodiment of the present invention, gradients are computed using the Sobel operators to detect edges. The present invention, however, is not limited in this respect. Instead, any edge detection tool may be employed provided that the directionality of the detected edge is computed. The Sobel operators are only one example of a possible edge detection technique. For example, the Prewitt operators as indicated in Equation 7 may be used.

$$Prewitt_x = \begin{bmatrix} -1 & 0 & 1 \\ -1 & 0 & 1 \\ -1 & 0 & 1 \end{bmatrix}, Prewitt_y = \begin{bmatrix} -1 & -1 & -1 \\ 0 & 0 & 0 \\ 1 & 1 & 1 \end{bmatrix}$$ [Equation 7]

Furthermore, gradients on blocks that have been low-pass filtered (using a low pass filter abbreviated as LPF) may be computed. More specifically, gradients may be computed using an operator obtained by convolving the Sobel operators or the Prewitt operators, and a filter coefficient included in an LPF. Thus, the edge detection unit 201 or 401 may compute gradients, for example, by selecting one filter out of (i) only the Sobel operators, (ii) only the Prewitt operators, (iii) a synthetic filter synthesized from the Sobel operators and an LPF, and (IV) a synthetic filter synthesized from the Prewitt operators and an LPF. A filter is selected, for example, based on an instruction from the user outside or a characteristic of an current block. When the current block includes a large amount of noise, i.e., the current block is not flat, for example, a filter including an LPF is used.

Furthermore, although the norm determination unit 203 of the image coding apparatus 100 or the norm determination unit 403 of the image decoding apparatus 300 according to the embodiment determines a norm using a predetermined threshold, the norm may be changed per sequence, picture, slice, or block. In this case, the predetermined threshold needs to be included in a bitstream and transmitted to a decoder. For example, information indicating a threshold may be included in a sequence parameter set (SPS), a picture parameter set (PPS), or a slice header (SH) on a per unit basis for determining a threshold.

Figure 19:
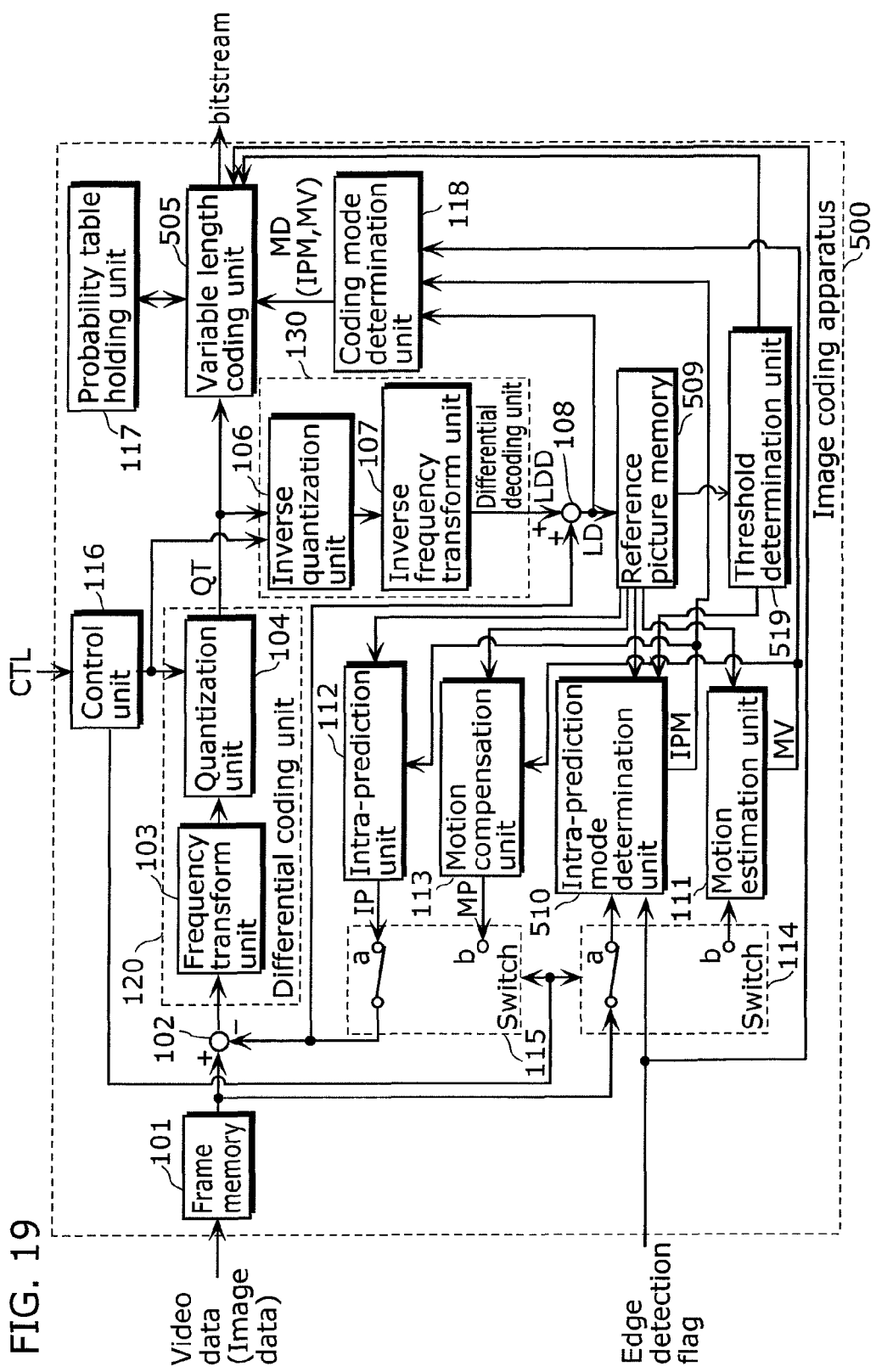
FIG. 19 is a block diagram illustrating an example of a configuration of an image coding apparatus having a configuration different from that of the image coding apparatus of the embodiment.

FIG. 19 is a block diagram illustrating an example of a configuration of an image coding apparatus 500 that differs from the image coding apparatus 100 of the embodiment. The image coding apparatus 500 in FIG. 19 differs from the image coding apparatus 100 in FIG. 2 in including: a variable length coding unit 505 in replacement of the variable length coding unit 105; a reference picture memory 509 in replacement of the reference picture memory 109; an intra-prediction mode determination unit 510 in replacement of the intra-prediction mode determination unit 110, and additionally a threshold determination unit 519. The same features as those of the image coding apparatus 100 in FIG. 2 will be omitted, and thus the differences will be mainly described hereinafter.

Furthermore, the image coding apparatus 500 may receive an edge detection flag from outside as illustrated in FIG. 19. The edge detection flag is a flag for switching between validity and invalidity of the edge detection. For example, validity and invalidity of the edge detection can be switched per sequence, picture, or slice.

The variable length coding unit 505 adds a threshold determined by the threshold determination unit 519 and the edge detection flag to a bitstream, in addition to the operations by the variable length coding unit 105. Information indicating a threshold and an edge detection flag are included, for example, in a SPS, PPS, and a SH.

The reference picture memory 509 stores the decoded images LDs generated by the adding unit 108. Then, the reference picture memory 509 outputs, as reference pictures, the decoded images LDs not only stored in the intra-prediction mode determination unit 510, the motion estimation unit 111, the intra-prediction unit 112, and the motion compensation unit 113 but also stored in the threshold determination unit 519.

The intra-prediction mode determination unit 510 receives an edge detection flag, in addition to the operations by the intra-prediction mode determination unit 110. Then, the intra-prediction mode determination unit 510 switches between validity and invalidity of the edge detection, according to the received edge detection flag. More specifically, when an edge detection flag indicates validity of the edge detection, the intra-prediction mode determination unit 510 performs the same processing as the intra-prediction mode determination unit 110. More specifically, when an edge detection flag indicates invalidity of the edge detection, the intra-prediction mode determination unit 510 always sets the intra-prediction mode set including the conventional DC prediction mode and the 8 prediction directions. In other words, the intra-prediction mode determination unit 514 does not perform edge detection.

Furthermore, the intra-prediction mode determination unit 510 determines a norm using the threshold determined by the threshold determination unit 519. The specific description of the norm determination process is omitted because it is previously described.

The threshold determination unit 519 reads a reference picture from the reference picture memory 509, and determines a threshold by computing a characteristic value of the read reference picture. The characteristic value of a reference picture is, for example, a variance and intensity of the reference picture in which edge detection is performed. For example, a larger value is assigned to a threshold for use in determining a norm, as a variance becomes larger. Since a larger variance indicates that a reference picture includes a large amount of noise, it is highly likely that an edge is wrongly detected. Thus, use of a larger threshold in determining a norm can reduce a possibility that an edge is wrongly detected.

Furthermore, the threshold determination unit 519 may determine a threshold based on a result of the edge detection on the previous picture. For example, a larger value is assigned to a threshold, as more edges are detected along a direction different from the direction of the previous picture. The edges detected along the different directions are larger in number, because there is a possibility that an edge is not accurately detected due to influence of noise. Thus, assigning a larger value to a threshold for use in determining a norm can reduce the possibility that an edge is wrongly detected.

As described above, the image coding apparatus 500 in FIG. 19 can adaptively change a threshold. Thereby, the image coding apparatus 500 can determine a more suitable threshold, and generate a more suitable predicted block. Thus, coded distortion and others can be reduced.

Furthermore, since the present invention can invalidate edge detection on a flat image that cannot sufficiently enjoy the advantage of the present invention, the processing load of the image coding apparatus 100 can be reduced, and coding process can be sped up.

Furthermore, the edge detection flag is transmitted to a decoder, preventing the decoder from performing edge detection on a bitstream in which the edge detection has not yet been performed.

The image decoding apparatus 300 of the embodiment needs to store, in the frame memory 304, not only the reference pixels 20 in FIG. 1 but also data of all pixels included in the blocks including the reference pixels 20 in order to perform the edge detection. Thus, the image decoding apparatus 300 may compute gradients at the same time when decoding surrounding blocks, i.e., obtaining pixel values of reference pixels necessary for computing the gradients, and store only the results of the computation in the frame memory 304. Here, the image decoding apparatus 300 can further save memory resources by storing only a norm (or gradient value) beyond a threshold, for example. Alternately, the image decoding apparatus 300 may store only the largest norm in each block and its pixel position.

Figure 20:
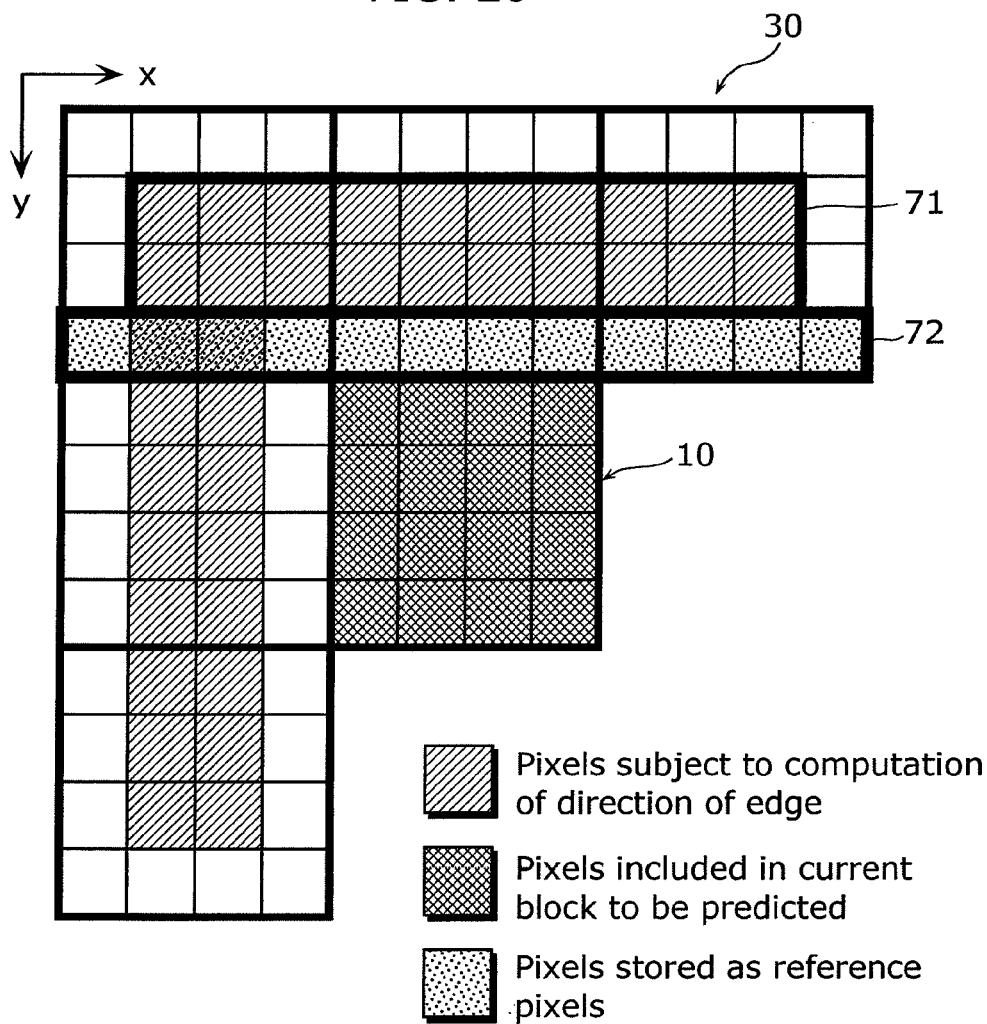
FIG. 20 is a schematic drawing illustrating an example of pixels to be stored in a memory according to the embodiment.

In this case, as illustrated in FIG. 20, pixels included in a pixel group 72 immediately above the current block 10 are stored as reference pixels to be referred to when a predicted block is generated, in the same manner as described for the conventional technique and the embodiment. Furthermore, not pixel values included in the surrounding blocks 30 but a norm (or gradient value) that is computed for pixels included in a pixel group 71 subject to computation of a direction of an edge is stored in the frame memory 304 or a memory and other media included in the norm determination unit 403.

Thereby, the memory resources of the image decoding apparatus 300 can be effectively used.

Furthermore, the method for computing predicted values may be replaced with any method duly in consideration of the detected direction of an edge, within the scope of the present invention. More specifically, reference pixels larger than the described reference pixels in number or other reference pixels may be used in replacement for reference pixels adjacent to the current block to be predicted.

Further, the present invention is not limited to the H.264 video coding standard or to the conventional intra-prediction mode set described above. In fact, the inventive edge prediction mode can also be used in any block-based video encoder using spatial prediction. In particular, the edge prediction mode may be used as an additional mode in H.264/AVC rather than as a replacement of the DC prediction mode.

Further, the inventive edge prediction mode may also be employed in conjunction with a signaling mechanism that is different from the above described combined signaling of the edge prediction mode and the DC prediction mode. In particular, the edge prediction mode may be signaled by a dedicated code word independent of the DC prediction mode or in combination with one or more of the predefined directional prediction modes.

Further, the present invention is not limited to video coding applications but may also be used for block-based still image coding.

Furthermore, the present invention can be implemented not only as an image coding apparatus, an image decoding apparatus, and a method thereof but also as a program causing a computer to execute an image coding method and an image decoding method of the embodiment. Furthermore, the present invention can be implemented as a recording medium that records the program, such as a computer-readable CD-ROM. Furthermore, the present invention can be implemented as information, data, or a signal each indicating the program. Furthermore, these program, information, data, and signal may be distributed through a communication network, such as the Internet.

A part or all of the constituent elements included in the respective image coding apparatus and image decoding apparatus may be configured from a single System-Large-Scale Integration (LSI). The System LSI is a super-multi-function LSI manufactured by integrating constituent units on one chip, and is specifically a computer system configured by including a microprocessor, a ROM, a RAM, and so on.

Summarizing, the present invention relates to coding and decoding of image data and video data, and in particular to a new spatial prediction mode for predicting the current block from image data of previously coded and decoded blocks. According to this prediction mode, blocks containing sharp edges may be predicted more faithfully by taking a precise direction of an edge into account. Moreover, the new prediction mode of the present invention does not require any additional signaling overhead, because (i) the direction of the edge can be predicted from previously coded blocks and (ii) the new prediction mode can be replaced with the conventional DC prediction mode for blocks containing sharp edges.

The image coding method and image decoding method of the present invention have an advantage of enhancing coding efficiency, and is applicable to, for example, a digital camera, a digital television, and a Blu-ray Disc (BD) recorder.

The invention claimed is:

1. A method for coding image data on a block-by-block basis, the method comprising:
partitioning the image data into a plurality of blocks;
generating a predicted block by predicting a current block that is one of the plurality of blocks;
computing a difference between the current block and the predicted block;
coding the difference computed;
decoding the difference coded; and
adding the difference decoded to the predicted block to generate a decoded block,
wherein the generating of the predicted block includes:
detecting a direction of an edge in a previously decoded block corresponding to a block adjacent to the current block, the edge being perpendicular to a gradient of pixel values; and
extrapolating or interpolating previously decoded image data along the direction of the edge detected to generate the predicted block, the previously decoded image data corresponding to a pixel included in the block adjacent to the current block.

2. The method for coding image data according to claim 1, wherein the previously decoded image data is linearly extrapolated or interpolated to generate the predicted block.

3. The method for coding image data according to claim 2, wherein a weighted sum of at least 2 pixel values of a plurality of decoded pixels included in the previously decoded image data is computed for each predicted pixel included in the predicted block, and the computed weighted sum is extrapolated or interpolated to generate the predicted block, and
wherein weights for computing the weighted sum are determined according to the direction of the edge detected.

4. The method for coding image data according to claim 3, wherein a larger value is assigned to each of the weights, as a distance from one of the plurality of decoded pixels to one of the predicted pixels is smaller, such that each of the plurality of decoded pixels respectively corresponds to one of the weights for computing the weighted sum.

5. The method for coding image data according to claim 2, wherein directions of at least 2 edges that are different from each other are detected, and
wherein the pixel values of the plurality of decoded pixels for extrapolation or interpolation along the directions of the at least 2 edges are combined for each of predicted pixels included in the predicted block, and the combined pixel values are extrapolated or interpolated to generate the predicted block.

6. The method for coding image data according to claim 5, wherein a weighted sum is computed for each of the predicted pixels by multiplying each of the weights by a corresponding one of the pixel values of the plurality of decoded pixels, and the computed weighted sum is extrapolated or interpolated to generate the predicted block, and
wherein a larger value is assigned to each of the weights, as a distance from one of the plurality of decoded pixels to the previously decoded block in which one of the at least 2 edges is detected is smaller, such that each of the plurality of decoded pixels respectively corresponds to one of the weights.

7. The method for coding image data according to claim 6, wherein a larger value is assigned to each of the weights, as a distance from one of the plurality of decoded pixels to an extension of one of the at least 2 edges is smaller, such that each of the plurality of decoded pixels respectively corresponds to one of the weights.

8. The method for coding image data according to claim 1, wherein the generating of the predicted block further includes selecting one of a plurality of prediction modes including an edge prediction mode, and
wherein, when the edge prediction mode is selected, the previously decoded image data is extrapolated or interpolated along the direction of the edge detected to generate the predicted block.

9. The method for coding image data according to claim 8, wherein the plurality of prediction modes further includes a DC prediction mode and a plurality of predefined directional prediction modes, and
wherein, in the extrapolating or interpolating of the previously decoded image data, pixel values of the previously decoded image data are averaged to generate the predicted block when the DC prediction mode is selected, and the previously decoded image data is extrapolated along a direction corresponding to a selected one of the plurality of directional prediction modes to generate the predicted block, when the one of the plurality of directional prediction modes is selected.

10. The method for coding image data according to claim 9, wherein, in the selecting of one of the plurality of prediction modes:
(i) one of the edge prediction mode and the plurality of directional prediction modes is selected when the direction of the edge is detected; and
(ii) one of the DC prediction mode and the plurality of directional prediction modes is selected when the direction of the edge is not detected.

11. The method for coding image data according to claim 10,
wherein, in the coding of the difference computed:
(i) when one of the plurality of directional prediction modes is selected, a mode indicator indicating the selected one of plurality of directional prediction modes is coded; and
(ii) when one of the DC prediction mode and the edge prediction mode is selected, a mode indicator indicating that the selected prediction mode is one of the DC prediction mode and the edge prediction mode is coded.

12. The method for coding image data according to claim 9, wherein, in the selecting of one of the plurality of prediction modes:
one of the edge prediction mode and the plurality of directional prediction modes is selected when the direction of the edge is detected and the direction of the edge detected points to the current block; and
one of the DC prediction mode and the plurality of directional prediction modes is selected when (i) the direction of the edge is not detected, or (ii) the direction of the edge is detected and the direction of the edge detected does not point to the current block.

13. The method for coding image data according to claim 1, wherein the detecting the direction of an edge includes:
computing a gradient vector for each of a plurality of pixels included in the previously decoded block corresponding to the block adjacent to the current block;
determining whether at least one of the gradient vectors computed satisfies conditions that (i) a norm of the at least one of the gradient vectors exceeds a predetermined threshold and (ii) a vector having a direction perpendicular to a direction of the at least one of the gradient vectors points to the current block; and detecting, as the direction of the edge, the direction perpendicular to the direction of at least one of the gradient vectors when the at least one of the gradient vectors computed satisfies the conditions determined.

14. The method for coding image data according to claim 13,
wherein, in the detecting of the edge having the direction, the direction of the edge is detected based on a direction of a gradient vector having a largest norm, the gradient vector having the largest norm corresponding to one of the at least one of the gradient vectors satisfying the conditions.

15. The method for coding image data according to claim 13,
wherein, in the detecting of the edge having the direction, the direction of the edge is detected based on a direction obtained by averaging directions of the at least one of the gradient vectors satisfying the conditions.

16. A method for decoding image data including a coded prediction residual on a block-by-block basis, the method comprising:
decoding the prediction residual of a current block;
generating a predicted block by predicting the current block; and
adding the predicted block generated to the prediction residual decoded to generate a decoded block,
wherein the generating the predicted block includes:
detecting a direction of an edge in a previously decoded block corresponding to a block adjacent to the current block, the edge being perpendicular to a gradient of pixel values; and
extrapolating or interpolating previously decoded image data along the direction of the edge detected to generate the predicted block, the previously decoded image data corresponding to a pixel included in the block adjacent to the current block.

17. The method for decoding image data according to claim 16,
wherein the previously decoded image data is linearly extrapolated or interpolated to generate the predicted block.

18. The method for decoding image data according to claim 17,
wherein a weighted sum of at least 2 pixel values of a plurality of decoded pixels included in the previously decoded image data is computed for each predicted pixel included in the predicted block, and the computed weighted sum is extrapolated or interpolated to generate the predicted block, and
wherein weights for computing the weighted sum are determined according to the direction of the edge detected.

19. The method for decoding image data according to claim 18,
wherein a larger value is assigned to each of the weights, when a distance from one of the plurality of decoded pixels to one of the predicted pixels is smaller, such that each of the plurality of decoded pixels respectively corresponds to one of the weights.

20. The method for decoding image data according to claim 17,
wherein directions of at least 2 edges that are different from each other are detected, and
wherein the pixel values of the plurality of decoded pixels for extrapolation or interpolation along the directions of the at least 2 edges are combined for each of predicted pixels included in the predicted block, and the combined pixel values are extrapolated or interpolated to generate the predicted block.

21. The method for decoding image data according to claim 20,
wherein a weighted sum is computed for each of the predicted pixels by multiplying each of the weights by a corresponding one of the pixel values of the plurality of decoded pixels, and the computed weighted sum is extrapolated or interpolated to generate the predicted block, and
wherein a larger value is assigned to each of the weights, when a distance from one of the plurality of decoded pixels to the previously decoded block in which one of the at least 2 edges is detected is smaller, such that each of the plurality of decoded pixels respectively corresponds to one of the weights.

22. The method for decoding image data according to claim 21,
wherein a larger value is assigned to each of the weights, when a distance from one of the plurality of decoded pixels to an extension of one of the at least 2 edges is smaller, such that each of the plurality of decoded pixels respectively corresponds to one of the weights.

23. The method for decoding image data according to claim 16,
wherein the generating of the predicted block further includes selecting one of a plurality of prediction modes including an edge prediction mode, and
wherein, when the edge prediction mode is selected, the previously decoded image data is extrapolated or interpolated along the direction of the edge detected to generate the predicted block.

24. The method for decoding image data according to claim 23,
wherein the plurality of prediction modes further includes a DC prediction mode and a plurality of predefined directional prediction modes, and
wherein, in the extrapolating or interpolating of the previously decoded image data, pixel values of the previously decoded image data are averaged to generate the predicted block when the DC prediction mode is selected, and the previously decoded image data is extrapolated along a direction corresponding to a selected one of the plurality of directional prediction modes to generate the predicted block, when the one of the plurality of directional prediction modes is selected.

25. The method for decoding image data according to claim 24,
wherein, in the selecting of one of the plurality of prediction modes:
(i) one of the edge prediction mode and the plurality of directional prediction modes is selected when the direction of the edge is detected; and
(ii) one of the DC prediction mode and the plurality of directional prediction modes is selected when the direction of the edge is not detected.

26. The method for decoding image data according to claim 25,
wherein the image data further includes a prediction mode indicator indicating a prediction mode, and
wherein, in the selecting of one of the plurality of prediction modes, (i) the edge prediction mode is selected when the prediction mode indicator indicates that the prediction mode to be selected is one of the DC prediction mode and the edge prediction mode and the direction of the edge is detected, and (ii) the DC prediction mode is selected when the direction of the edge is not detected.

27. The method for decoding image data according to claim 24,
 wherein, in the selecting of one of the plurality of prediction modes:
 one of the edge prediction mode and the plurality of directional prediction modes is selected when the direction of the edge is detected and the direction of the edge detected points to the current block; and
 one of the DC prediction mode and the plurality of directional prediction modes is selected when (i) the direction of the edge is not detected, or (ii) the direction of the edge is detected and the direction of the edge detected does not point to the current block.

28. The method for decoding image data according to claim 16,
 wherein the detecting the direction of an edge includes:
 computing a gradient vector for each of a plurality of pixels included in the previously decoded block corresponding to the block adjacent to the current block;
 determining whether at least one of the gradient vectors computed satisfies conditions that (i) a norm of the at least one of the gradient vectors exceeds a predetermined threshold and (ii) a vector having a direction perpendicular to a direction of the at least one of the gradient vectors points to the current block; and
 detecting, as the direction of the edge, the direction perpendicular to the direction of at least one of the gradient vectors when the at least one of the gradient vectors computed satisfies the conditions in the determining.

29. The method for decoding image data according to claim 28,
 wherein, in the detecting of the edge having the direction, the direction of the edge is detected based on a direction of a gradient vector having a largest norm, the gradient vector having the largest norm corresponding to one of the at least one of the gradient vectors satisfying the conditions.

30. The method for decoding image data according to claim 28,
 wherein, in the detecting of the edge having the direction, the direction of the edge is detected based on a direction obtained by averaging directions of the at least one of the gradient vectors satisfying the conditions.

31. An image coding apparatus that codes image data on a block-by-block basis, the image coding apparatus comprising:
 a non-transitory computer-readable memory device storing a program; and
 at least one hardware processor configured to execute the program and cause the apparatus to operate as:
 a partitioning unit configured to partition the image data into a plurality of blocks;
 a generating unit configured to generate a predicted block by predicting a current block that is one of the plurality of blocks;
 a computing unit configured to compute a difference between the current block and the predicted block;
 a coding unit configured to code the difference computed by the computing unit;
 a decoding unit configured to decode the difference coded by the coding unit; and
 an adding unit configured to add the difference decoded by the decoding unit to the predicted block to generate a decoded block,
 wherein the generating unit includes:
 a detecting unit configured to detect a direction of an edge in a previously decoded block corresponding to a block adjacent to the current block, the edge being perpendicular to a gradient of pixel values; and
 an extrapolating or interpolating unit configured to extrapolate or interpolate previously decoded image data along the direction of the edge detected by the detecting unit to generate the predicted block, the previously decoded image data corresponding to a pixel included in the block adjacent to the current block.

32. An image decoding apparatus that decodes image data including a coded prediction residual on a block-by-block basis, the image decoding apparatus comprising:
 a non-transitory computer-readable memory device storing a program; and
 at least one hardware processor configured to execute the program and cause the apparatus to operate as:
 a decoding unit configured to decode the prediction residual of a current block;
 a generating unit configured to generate a predicted block by predicting the current block; and
 an adding unit configured to add the predicted block generated by the generating unit to the prediction residual decoded by the decoding unit to generate a decoded block,
 wherein the generating unit includes:
 a detecting unit configured to detect a direction of an edge in a previously decoded block corresponding to a block adjacent to the current block, the edge being perpendicular to a gradient of pixel values; and
 an extrapolating or interpolating unit configured to extrapolate or interpolate previously decoded image data along the direction of the edge detected in the detecting to generate the predicted block, the previously decoded image data corresponding to a pixel included in the block adjacent to the current block.

33. A codec apparatus, comprising:
 a non-transitory computer-readable memory device storing a program; and
 at least one hardware processor configured to execute the program and cause the codec apparatus to operate as:
 an image coding apparatus that codes image data on a block-by-block basis, and includes:
 a partitioning unit configured to partition the image data into a plurality of blocks;
 a generating unit configured to generate a predicted block by predicting a current block that is one of the plurality of blocks;
 a computing unit configured to compute a difference between the current block and the predicted block;
 a coding unit configured to code the difference computed by the computing unit;
 a decoding unit configured to decode the difference coded by the coding unit; and
 an adding unit configured to add the difference decoded by the decoding unit to the predicted block to generate a decoded block,
 wherein the generating unit includes:
 a detecting unit configured to detect a direction of an edge in a previously decoded block corresponding to a block adjacent to the current block, the edge being perpendicular to a gradient of pixel values; and
 an extrapolating or interpolating unit configured to extrapolate or interpolate previously decoded image data along the direction of the edge detected by the detecting unit to generate the predicted block, the previously decoded image data corresponding to a pixel included in the block adjacent to the current block; and
 the image decoding apparatus according to claim 32.

* * * * *